(12) United States Patent
Seki

(10) Patent No.: US 10,639,694 B2
(45) Date of Patent: May 5, 2020

(54) METHOD FOR MACHINING OUTER CIRCUMFERENCE OF METAL END CROSS-SECTION AND METHOD FOR JOINING METAL COMPONENT OBTAINED BY THE MACHINING METHOD WITH ANOTHER MEMBER

(71) Applicant: SEKI PRESS CO. LTD., Ibaraki (JP)

(72) Inventor: Masakatsu Seki, Ibaraki (JP)

(73) Assignee: SEKI PRESS CO. LTD., Ibaraki (JP)

( * ) Notice: Subject to any disclaimer, the term of this patent is extended or adjusted under 35 U.S.C. 154(b) by 287 days.

(21) Appl. No.: 15/540,341

(22) PCT Filed: Jan. 5, 2016

(86) PCT No.: PCT/JP2016/050105
§ 371 (c)(1),
(2) Date: Jun. 28, 2017

(87) PCT Pub. No.: WO2016/111284
PCT Pub. Date: Jul. 14, 2016

(65) Prior Publication Data
US 2017/0368588 A1    Dec. 28, 2017

(30) Foreign Application Priority Data

Jan. 7, 2015 (JP) ................................ 2015-001319

(51) Int. Cl.
*B21D 19/08* (2006.01)
*B23P 13/04* (2006.01)
(Continued)

(52) U.S. Cl.
CPC .......... *B21D 19/08* (2013.01); *B21D 19/046* (2013.01); *B21D 19/12* (2013.01); *B21D 28/00* (2013.01);
(Continued)

(58) Field of Classification Search
CPC ...... B21D 19/08; B21D 19/12; B21D 19/046; B21D 28/00; B21D 39/04; B21D 39/048;
(Continued)

(56) References Cited

U.S. PATENT DOCUMENTS

| 4,290,295 A | 9/1981 | Kanamaru et al. |
| 5,651,181 A | 7/1997 | Shohara et al. |
| 2014/0349131 A1 | 11/2014 | Seki |

FOREIGN PATENT DOCUMENTS

| JP | H08300082 A | 11/1996 |
| JP | 2002045940 A | 2/2002 |

(Continued)

OTHER PUBLICATIONS

Extended European Search Report received for European Patent Application No. 16735023.0, dated Jan. 5, 2018, 5 pages.

(Continued)

*Primary Examiner* — Jermie E Cozart

(57) ABSTRACT

Provided are a method for machining the outer circumference of a metal end cross-section, the method being capable of easily forming at least any of a deep groove, a deep recess, and a flange which are smooth and uniform in the longitudinal direction of a metal rod or metal pipe in the periphery of the cross-section of any of the end part of the metal rod or metal pipe, the drawn end part of the metal rod or metal pipe, and the hub hole forming part of the metal pipe; and a method for joining a metal component obtained by the machining method with another member. The machining method of the present invention is characterized in that: splitting is advanced by successively repeating press forming operation multiple times by using a slitting punch, in which a tip part has a sharp cutting edge, and the cutting edge is formed so as to have a shape equal to or partly equal to the outer shape of the cross section of a metal end part and so as to have a diameter smaller than the outer diameter of (Continued)

the cross section of the splitting object; and in order to control the depth of metal cracking cleft created with each press forming operation, a pressing die for pinching the outside of a metal rod or at least a pressing die of one side of pressing dies for pinching the inside and the outside of a metal pipe is disposed while its position is moved according to the distance of a split portion.

12 Claims, 15 Drawing Sheets

(51) Int. Cl.
| | | |
|---|---|---|
| *B21D 19/12* | (2006.01) | |
| *B21D 28/00* | (2006.01) | |
| *F16L 13/14* | (2006.01) | |
| *B21D 39/04* | (2006.01) | |
| *B23P 13/02* | (2006.01) | |
| *B21D 19/04* | (2006.01) | |
| *B21K 21/12* | (2006.01) | |
| *B23P 11/00* | (2006.01) | |
| *F16B 17/00* | (2006.01) | |
| *B23P 13/00* | (2006.01) | |

(52) U.S. Cl.
CPC ........... *B21D 39/04* (2013.01); *B21D 39/046* (2013.01); *B21D 39/048* (2013.01); *B23P 13/02* (2013.01); *B23P 13/04* (2013.01); *F16L 13/141* (2013.01); *B21K 21/12* (2013.01); *B23P 11/00* (2013.01); *B23P 13/00* (2013.01); *F16B 17/004* (2013.01)

(58) Field of Classification Search
CPC ........... B23P 13/00; B23P 13/02; B23P 13/04; F16B 17/004; F16L 13/141; B21K 21/12
See application file for complete search history.

(56) References Cited

FOREIGN PATENT DOCUMENTS

| | | |
|---|---|---|
| JP | 2003071538 A | 3/2003 |
| JP | 2004034033 A | 2/2004 |
| JP | 2008071538 A | 3/2008 |
| JP | 5165806 B1 | 3/2013 |
| JP | 5219178 B1 | 6/2013 |
| JP | 2014029197 A | 2/2014 |
| WO | 0054905 A1 | 9/2000 |
| WO | 2000061316 A1 | 10/2000 |
| WO | 2008029910 A1 | 3/2008 |

OTHER PUBLICATIONS

International Search Report received for PCT Patent Application No. PCT/JP2016/050105, dated Jan. 7, 2015, 3 pages.

FIG. 4A
FIG. 4B
FIG. 4C
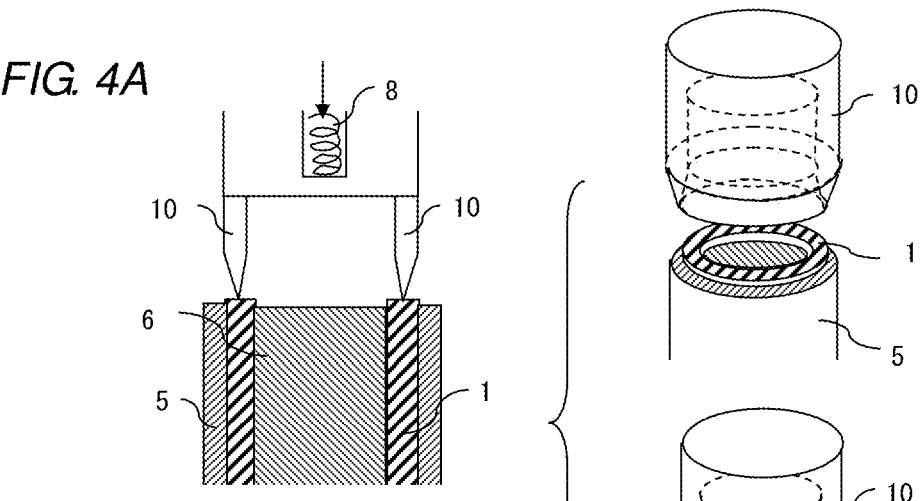
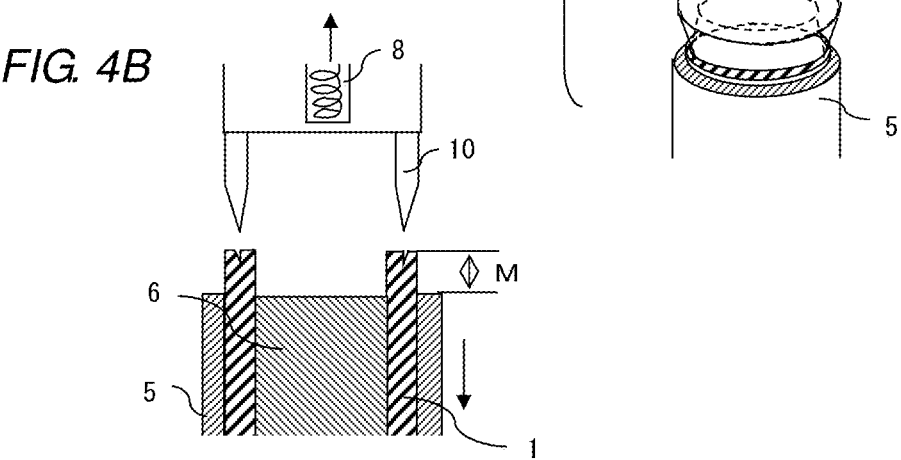
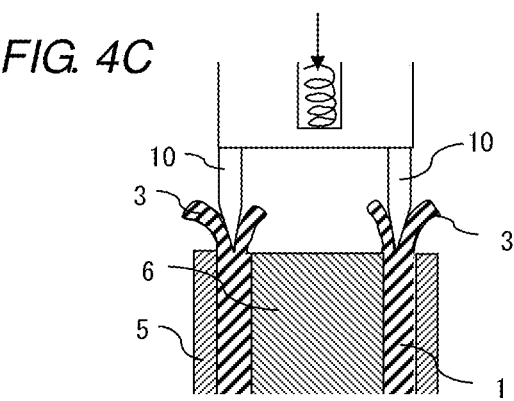

Hub hole forming part on metal pipe (before processing)

Hub hole forming part on metal pipe (after processing)

Tip — Linear part

Linear part

Linear part — Linear part

First stage   Third stage   Fifth stage
  Second stage   Fourth stage

METHOD FOR MACHINING OUTER CIRCUMFERENCE OF METAL END CROSS-SECTION AND METHOD FOR JOINING METAL COMPONENT OBTAINED BY THE MACHINING METHOD WITH ANOTHER MEMBER

CROSS-REFERENCE TO RELATED APPLICATIONS

This application is a national phase claiming the benefit of and priority to International Patent Application No. PCT/JP2016/050105, entitled "METHOD FOR MACHINING OUTER CIRCUMFERENCE OF METAL END CROSS-SECTION AND METHOD FOR JOINING METAL COMPONENT OBTAINED BY THE MACHINING METHOD WITH ANOTHER MEMBER", filed Jan. 5, 2016, which claims priority to Japanese Patent Application No. 2015-001319, filed Jan. 7, 2015, which are hereby incorporated by reference in their entireties.

TECHNICAL FIELD

The present invention relates to a method for machining the outer circumference of a metal end cross-section and to a joining method for a metal component obtained by the machining method with another member. The invent method easily forms at least one of smooth and uniform deep grooves, deep recesses, and flanges in the longitudinal direction of a metal rod or a metal pipe by splitting machining. The method forms such shape on the periphery of the cross section of any one of the metal rod end or the metal pipe end, the drawn end of the metal rod or the metal pipe, and a hub hole forming part on the metal pipe.

BACKGROUND ART

Conventionally, peripheral processing of a metal rod or a metal pipe has used the forging forming by plastic deformation using a punch or a die (see Patent Literatures 1 and 2 for example). Patent Literature 1 has proposed a method for press forming a can body having ribs on its outer surface or inner surface. In the proposed method, a female mold having an approximately circular cross section is press formed, a plurality of grooves are formed on the inner circumferential surface of the female mold or on the outer circumferential surface of a columnar punch, and pellets are put on the bottom of the female mold, and then, the punch is pressed against the pellet in the female mold to obtain a can body.

In addition, Patent Literature 2 has proposed a manufacturing method of pipe-shaped workpieces by forging as a method for forming a stepped part (serration part) on the bottom of the pipe-shaped material alternative to the conventional cutting method. In the manufacturing method described in Patent Literature 2, the bottom of the pipe-shaped material is guided by an upper mold into the annular gap formed between a guide pin and a serration-shaped concave-convex part, and the serration part is forging-formed on the outer circumference of the bottom part of the pipe-shaped material.

Forging forming by plastic deformation has also been applied as a technique for machining the outer circumference of a metal plate material in addition to metal rods or metal pipes. For example, Patent Literature 3 discloses a technique for forming a concave groove which technique can form a concave groove having a desired shape and a thin-thickness hard wall on the outer circumference of a metal plate material at low cost by press machining.

Further, as another method for machining the periphery of metals, Patent Literature 4 discloses a method for forming locking projections. The disclosed method presses plural circumferential positions around the holding hole of the mounting plate using a wedge-shaped first punch to form the primal-form of each locking projection by plastic deformation; and then each of the primal-form of locking projections is plastically deformed radially inwardly to form each locking projection.

Each of the above-mentioned machining methods is mainly for performing periphery processing of a metal rod or a metal pipe. On the other hand, however, various methods have also been proposed for machining the cross section of the end of a metal plate or a metal rod. For example, Patent Literature 5 has disclosed a method for producing integrally the flange part and the dust cover in manufacture of drum brakes. In the disclosed method, the outer circumference of a bottomed metal cylinder is cut using a cutting die while rotating the bottomed metal cylinder, and then drawing process is applied on the cut-part using a pressing die to form a cylindrical part that becomes the dust cover.

The method for splitting the end of metal described in Patent Literature 5 is for machining an edge part of periphery of a brake shoe that is a circular metal material. Other than a circular metal material, however, if there is a method that is able to divide, in the horizontal direction, the edge of a metal plate having any shape of rectangle, polygon, and ellipse, or is able to divide a metal rod having any of circular, elliptic, rectangular, and polygonal cross section, such splitting method sees expectation for various use. With this, the present invention previously developed a new method for splitting the end of a metal plate or a metal rod (Patent Literatures 4 and 5). In this new method for splitting the end part, the press-splitting with a slitting punch or a cleaving punch is performed not only one time but performed continuously many times, and the position of clamping dies, which pinch the metal plate or the metal rod, is moved at every press-splitting operation step so that the length of cleft created by splitting can be freely adjusted within a desired range to optimize.

LITERATURES OF PRIOR ARTS

Patent Literatures

{Patent Literature 1} International Publication No. 2008/029910
{Patent Literature 2} Japanese Unexamined Patent Application Publication No. 2003-71538
{Patent Literature 3} Japanese Unexamined Patent Application Publication No. 2004-34033
{Patent Literature 4} Japanese Unexamined Patent Application Publication No. 2014-29197
{Patent Literature 5} Japanese Unexamined Patent Application Publication No. 2002-45940
{Patent Literature 6} Japanese Patent No. 5165806
{Patent Literature 7} Japanese Patent No. 5219178

SUMMARY OF THE INVENTION

Technical Problem

The forging forming method described in the above-mentioned Patent Literatures 1 and 2 is such a machining method as uses a female mold which determines the outer shape of a molded article so as to make the outer circumferential part of a metal rod or a metal pipe have a desired shape. This method is however not suitable for forming smooth and uniform deep grooves or deep recesses on the periphery of the cross section of any of the end of the metal rod or the metal pipe, the drawn end of the metal rod or the metal pipe, or the hub hole forming part on the metal pipe, in the longitudinal direction of a metal rod or a metal pipe.

The method described in Patent Literature 3 is to form a recessed groove by press machining and the method needs to provide a press having a ridge with a shape corresponding to the recessed groove in order to form a minute or fine recessed groove on the periphery of the cross section of the metal end. However, it is difficult to prepare such a ridge on a press die from the viewpoint of machining accuracy and yield strength at the time of press forming operation. Thus, the applicable range of this method is greatly restricted, because the aspect such as shape and depth of the grooves or recesses which is to be formed on the periphery of the cross section of the metal end are limited. In addition, when the shape or dimensions of the recessed groove of a formed product is changed, a requirement arises for fabrication of a press die newly from the beginning with difficulty in responding to detailed change of specifications. This means that this method is unsuitable for small-volume production in great varieties. This drawback is a technical problem similarly occurring in manufacturing a female mold for the forging described in the above-mentioned Patent Literatures 1 and 2.

In the machining method described in Patent Literature 4, a V-shaped recessed groove is formed by pressing a wedge-shaped first punch, and at the same time, a part between each of the recessed grooves and the inner peripheral edge of a retaining hole is plastically deformed in the radial direction. However, the Literature provides no description about the method for forming the V-shaped recessed groove in a desired shape and depth, or about a metal mold, a jig, etc. for producing such V-shaped products. Considering that the machining is performed by pressing a punch relying on the plastic deformation, it is not realistic to apply the method of forming a recessed groove described in the above-mentioned Patent Literature 4 as it is to the forming of smooth and uniform deep grooves or deep recesses on the periphery of the cross section of any one of the metal rod end or the metal pipe end, a drawn end of the metal rod or the metal pipe, and a hub hole forming part on a metal pipe in the longitudinal direction of a metal rod or a metal pipe.

In the method described in Patent Literature 5, the circumference of the outer circumferential part of a bottomed cylindrical metal body is cut by a cutting die. In this processing machining however, the bottomed cylindrical metal body needs to be rotated in order to form a uniformly divided surface. Therefore, the applicable range of this method is limited to those metal plates, metal rods, etc., which can be rotated uniformly; and cannot be used for those having a large diameter and long length, or those having complicated and irregular shapes. In addition, it is difficult to machine only a limited local part around the cross section of the end of the metal rod or metal pipe to form a smooth and uniform deep grooves or deep recesses; and to do so demands not only a high degree of skill but also complicated operation.

Further, the end splitting method described in Patent Literatures 6 and 7 permits a wider range of choice of applicable shapes of a metal plate or metal rod compared to that of the manufacturing method described in the above-mentioned Patent Literature 5, and allows manufacturing a metal plate or a metal rod having a T-shaped, an L-shaped, or a Y-shaped configuration at low cost because of reduced material and man-hours. However, the end splitting method described in the Patent Literatures 6 and 7 is a method for dividing the cross section of one end of a metal plate or metal rod from the center to the periphery at one time; the literature has not discussed any features of the method from the viewpoint of forming deep grooves or deep recesses on the periphery of the cross section of any one of the metal rod end or the metal pipe end, a drawn end of the metal rod or the metal pipe, and a hub hole forming part on a metal pipe, in the longitudinal direction of a metal rod or metal pipe. Therefore, it was not possible to apply the end splitting method described in Patent Literatures 6 and 7 as it was.

The present invention has been made to solve such a problem. The splitting method described in above-mentioned Patent Literatures 6 and 7 applied to the end dividing of a metal plate or a metal rod was fundamentally reviewed by the inventor of the present invention with respect to the structure and shape of the punch and clamping die and splitting conditions. The review attempting to optimize such conditions has newly established a method for processing the outer circumference of the cross section of any of the end of a metal rod or metal pipe, the drawn end of a metal rod or metal pipe, or the hub hole forming part on the metal pipe. The aim of the present invention is therefore to provide on the basis of the newly acquired knowledge a method for machining the outer circumference of the cross section of a metal end, wherein the method is able to easily form any of a smooth and uniform deep groove, a deep recess, and a flange in the longitudinal direction of a metal rod or a metal pipe freely adjusting their shapes and depths.

Further, another object of the present invention is to provide a joining method that uses a metal component obtained by the above-mentioned machining method on the outer circumference of the cross section of the metal end to join with another member, wherein the joining method makes aligning joining materials each other easy at the time of joining and, not only increases the strength and reliability of joining or bonding, but also easily achieves the bonding between different materials.

Means for Solving Problems

The inventor of the present invention has found a solution that can solve the above-mentioned problems, and has reached the present invention. The solution includes, in machining the outer circumference of the cross section of any of the end of a metal rod or a metal pipe, the drawn end of a metal rod or a metal pipe, or the hub hole forming part on a metal pipe, performing the press-splitting using the slitting punch not only one time but continuously more than once in order to form smooth and uniform deep grooves, deep recesses, and flanges in the longitudinal direction of the metal rod or metal pipe; employing a method of internal splitting in the cross section capable of controlling freely the length (or depth) of the cleft created by the splitting to a desired range; employing a new structures and shapes for slitting punches; optimizing the structure of the clamping die for pinching a metal plate or a metal rod each time the press-splitting; and optimizing the moving method of the clamping die that is moved to determine the splitting length created by the splitting.

The configuration of the present invention is as follows.

[1] The present invention is to provide

A method for machining the outer circumference of the cross section of any of the end of a metal rod or a metal pipe, the drawn end of a metal rod or a metal pipe, and a hub hole forming part on a metal pipe by splitting method using a slitting punch to form at least any one of a deep groove, a deep recess, and a flange on the periphery thereof, the method characterized in that the tip of the slitting punch has a sharp cutting edge of the same or partly same outline as the cross section of the end of any of the metal rod or the metal pipe, the drawn end of the metal rod or the metal pipe, and the hub hole forming part on the metal pipe, wherein the diameter of the slitting punch is smaller than the outer diameter of the cross section of the splitting object; and the method includes the processing steps of abutting the slitting punch on a position on the periphery of the cross section of the end of any of the metal rod or the metal pipe, the drawn end of the metal rod or the metal pipe, and the hub hole forming part on the metal pipe to form a cleft; and advancing further the splitting in the longitudinal direction of the metal rod or the metal pipe by repeating the press-splitting operation by the slitting punch at the cleft for further or repeatedly one or two or more times;

wherein, when machining the outer circumference of the cross section of any one of the end of the metal pipe, the drawn end thereof, and the hub hole forming part thereon, the depth of the cleft created in the metal by the press-splitting each time of the press-splitting operation is adjusted in advance by disposing one end of one side of the set of clamping dies, which pinch the inside and the outside of the metal pipe at opposite positions in a state of contacting with whole circumferential surfaces of both sides, at the same position as the fore-end of a split-desired portion from the edge of one end face of the metal pipe, and by disposing one side of the other side of the set of clamping dies at the same position as the fore-end of a split-desired portion from the edge of one end face of the metal pipe, or at the same position as the edge of the end face of the metal pipe so as to support the metal pipe, and when machining the outer circumference of the cross section of any one of the metal rod end and the drawn end of the metal rod, the depth of the cleft created in the metal by the press-splitting each time of the press-splitting operation is adjusted in advance by disposing one end of the clamping die, which pinches the outside of the metal rod in a state of contacting with whole circumferential surface of the outside thereof, at the same position as the fore-end of a split-desired portion from the edge of the one end face of the metal rod.

[2] The present invention is to provide a method for machining the outer circumference of the cross section of the metal end according to the method defined in the method [1] stated above, the method characterized in that the slitting punch has a cutting edge having the same shape as the cross-sectional outline of any one of the end of the metal rod or the metal pipe, the drawn end of the metal rod or the metal pipe, and the hub hole forming part on the metal pipe.

[3] The present invention is to provide a method for machining the outer circumference of the cross section of the metal end according to the method defined in the method [1] stated above to form partially at least any one of a deep groove, a deep recess, and a flange on the periphery thereof, the method characterized in that the press-splitting is performed, using a slitting punch formed to have a diameter smaller than the outer diameter of the cross section of the splitting object, on the periphery of the cross section of one of the metal rod end or the metal pipe end, the drawn end of the metal rod or the metal pipe, and the hub hole forming part on the metal pipe, wherein the cutting edge of the slitting punch has the partially same shape as the cross-sectional outline of any one of the end of the metal rod or the metal pipe, the drawn end of the metal rod or the metal pipe, and the hub hole forming part on the metal pipe; and, when forming at least one of a deep groove, a deep recess and a flange, a notch or a scribe line is provided in advance at positions corresponding to both sides of the periphery of the cross section of the metal pipe on which the slitting punch is abutted to partially form at least one of the deep groove, the deep recess, and the flange on the periphery of the cross section, preventing the cleft created in metal at the time of the press-splitting from spreading to the part other than the part to which the slitting punch is abutted.

[4] The present invention is to provide a method for machining the outer circumference of the cross section of the metal end according to the method defined in any one of the methods [1] to [3] stated above, the method characterized in that the cutting edge of the slitting punch has such a shape that the cross section with respect either to the inner side or to the outer side in the radial direction of the metal pipe or the metal rod has a linear part from the tip toward the rear end.

[5] The present invention is to provide a method for machining the outer circumference of the cross section of the metal end according to the method defined in any one of the methods [1] to [4] stated above, the method comprising:

a step of dividing by the splitting in the longitudinal direction with respect to the metal plate or the metal rod on the periphery of the cross section of one of the metal rod end or the metal pipe end, the drawn end of the metal rod or the metal pipe, and the hub hole forming part on the metal pipe, and a step of advancing further such dividing by the splitting;

wherein each press-splitting step by the slitting punch is carried out in a progressive transfer method consisting of steps separated each other;

when machining the outer circumference of the cross section of one of the metal pipe end, the drawn end, and the hub hole forming part, the position of at least one side of the clamping dies that pinch the inside and the outside of the metal pipe is moved in advance at each process of press-splitting in accordance with the distance from the edge of one end face of the cross section of the metal pipe to the fore-end of the split-desired portion; and, when machining the outer circumference of the cross section of one of the metal rod end and the drawn end of the metal rod, one end of the clamping die that pinches the outer side of the metal rod is moved in accordance with the distance from the edge of one end face of the cross section of the metal rod to the fore-end of the slitting-intended part.

[6] The present invention is to provide a method for machining the outer circumference of the cross section of the metal end according to the method defined in any one of the methods [1] to [5] stated above, the method characterized in that at least one of the deep groove, the deep recess, and the flange is processed into a desired shape by performing the process of at least one of press forming, bending, cutting, edge trimming, and boring after the splitting process for forming at least one of the deep groove, the deep recess, and the flange.

[7] The present invention is to provide a method for joining metal component with another member, the method comprising the steps of: inserting the other member between at least any of a deep groove, a deep recess, and a flange formed on the outer periphery of the cross section of a metal end by the method defined in any one of the methods [1] to [6] stated above, wherein the other member is made of material selected form the group consisting of metal, plastic, ceramic, glass, and wood; and joining the inserted other member to a metal rod or a metal pipe having at least one of the deep groove, the deep recess, and the flange by any of method of pressing, welding, fusing, bolting, riveting and glue.

Advantageous Effects of Invention

The method of machining the outer circumference of the cross section of a metal end according to the present invention is able to facilitate machining on the periphery of cross section of any of the end of a metal rod or a metal pipe, the drawn end of a metal rod or a metal pipe, and the hub hole forming part on a metal pipe by a splitting method that uses a slitting punch having a new structure and shape. Furthermore, the invented method is able to form smoothly and uniformly at least one of a deep groove, a deep recess, and a flange, the depth (or length) of which can be freely adjusted within the desired range, in the longitudinal direction, by applying a splitting method that performs a press-splitting using the slitting punch continuously multiple or more times and by optimizing the structure of the clamping die and the clamping position at that time.

In addition, the machining method of the present invention can provide a method for processing on outer circumference of the cross section of a metal end, which offers superior mass productivity with low manufacturing cost by not only performing the press-splitting by slitting punch in one direction with a predetermined stroke but also performing continuous splitting in a progressive transfer method.

Metal components manufactured by the method for machining the outer circumference of the cross section of the metal end of the present invention offers an eased positional alignment with another member made of one material selected from the group consisting of metal, plastic, ceramic, glass, and wood, allowing an eased joining by a simple operation. Furthermore, the reliability and the durability of the joint between the metal components and another member is greatly increased by applying, after inserting the other member between at least any of the deep groove, the deep recess, and the flange formed on the outer periphery of the cross section of the metal end, any of the methods of pressing, welding, fusing, bolting, riveting, and glue on the deep groove or the deep recess formed by the method of the present invention. As a result, it becomes possible to expand the application as a simple low-cost joining method in fields that demand higher heat resistance and compatibility with more severe environment.

BRIEF DESCRIPTION OF DRAWINGS

FIGS. 4A to 4C describe another example process of a machining method applied on a periphery of a cross section of a metal pipe end according to a third embodiment of the present invention.

DESCRIPTION OF EMBODIMENTS

Figure 1A:
FIGS. 1A and 1B are external perspective views showing a metal pipe after splitting the periphery of one end of edge thereof by the machining method of the present invention.

A method for machining the outer circumference of the cross section of a metal end of the present invention is to perform splitting on the periphery of the cross section of any of the end of a metal rod or a metal pipe, the drawn end of a metal rod or a metal pipe, and a hub hole forming part in the metal pipe, in the longitudinal direction of the metal rod or the metal pipe. Here, the term "drawn end of a metal rod or a metal pipe" means an end part of a small diameter part formed on the end of a metal rod or a metal pipe given a certain diameter by drawing. Further, "hub hole forming part on a metal pipe" means such a part as has an opening of a predetermined diameter of hole (or bore) and an opening fore-end of a predetermined diameter, which are formed on the side of the metal pipe at the intermediate thereof. Unlike the end-splitting methods described in Patent Literatures 6 and 7 for an even division of the cross section of one end of a metal rod or a metal pipe, the splitting method of the present invention has mainly the following three features.

The first feature is that the slitting punch used in splitting the outer circumference of the cross section of the metal end in the longitudinal direction of the metal rod or the metal pipe has a sharp cutting edge at its tip, wherein the cutting edge has the same or partly same outline as the cross section of the end of any of the metal rod or the metal pipe, the drawn end of the metal rod or the metal pipe, and the hub hole forming part on the metal pipe, and has a smaller diameter than the outer diameter of the cross section of the splitting object. For example, when the machining method of the present invention is to be applied to a circular-cross section metal pipe having an outer diameter and an inner diameter of 8 mm and 5.5 mm respectively, a circular-cross section slitting punch having a diameter of 7 mm is used. In addition, the cross section of the cutting edge at the tip may be a shape constituting a part of a circle, for example, a semicircle, a quadrant, etc. In this, the diameter of the cutting edge at the tip of the slitting punch can be determined in accordance with the contour of the metal pipe after processing, except for deep grooves, deep recesses, or flanges, which are formed by splitting.

In addition, the shape of metal pipe to be machined by the method of the present invention is not limited to a circular cross section; it may be a box shape such as a square or rectangular shape, a polygonal shape, or an elliptical shape. In the present invention, the machining on the periphery of the cross section of a metal rod or a metal pipe is also practicable by using a slitting punch having a cutting edge cross section changed to such as a square or rectangular shape, a polygonal or an elliptical shape, or a shape of a part of such shapes instead of using a slitting punch having a cutting edge of circular cross section at the punch tip. Also, the outer diameter of the metal rod or the outer diameter and the inner diameter of the metal pipe is also not particularly limited; these dimensions can be 0.01 mm or over for small ones and 1 m or over for large ones.

In the slitting punch to be used in the present invention, it is an essential requirement that the tip should have a sharp cutting edge. It is practical that both side surfaces have a tip-thinning, or tapered, shape with a predetermined angle or curvature toward the rear end (the proximal end of the slitting punch) from the cutting edge. In addition, the two side surfaces may have two or more tapered portions having different angles or curvatures. Among them, in the present invention, it is preferable to use a slitting punch wherein one of the inner and outer cross sections with respect to the radial direction of the metal pipe or the metal rod has a straight part from the cutting edge toward the rear end part. In other words, it is preferable to use a slitting punch having a straight flat part on one side surface from the cutting edge to the rear end part. This is an indispensable configuration when machining the cross section of the end of a metal rod. In addition, also in a case where a flange part formed by slitting in the machining of the cross section of the end of a metal pipe is overhanging to both the inner and outer sides of the metal pipe, that style is a preferable configuration to avoid problem such that the distance (depth) over which the split part can be formed may be restricted, because the flange part will otherwise come into contact with the inside of the metal pipe and the slitting will not advance smoothly in such overhanging situation.

The second feature is that, in splitting the periphery of the metal end is progressed in the longitudinal direction of a metal rod or a metal pipe by repeating press-splitting multiple times using a slitting punch, the structure and arrangement of the clamping dies used to control the depth (or distance) of the split part differs from those described in Patent Literatures 6 and 7. The clamping die described in Patent Literatures 6 and 7 pinches the metal rod or the metal plate at least at two facing positions on the periphery of the metal rod or both surfaces of the metal plate. In contrast to this in the present invention, a metal rod is held being clamped only at the outside thereof; when a metal pipe is to be held, clamping dies having such a construction as pinch the pipe at two opposite positions thereof is employed and such clamping die is disposed so as to pinch the metal pipe from both sides.

The third feature is that the clamping die is moved so as to be located at the same position as the fore-end of the split-desired portion from the edge of one end face of the cross section of the metal pipe in order to adjust in advance the depth of the cleft in the metal which is created by the press-splitting each time of the press-splitting operation. The manner of moving is different between metal rods and metal pipes, and is performed in accordance with the shape of the objective workpiece of metal. That is, for a metal pipe, one end of one side of the clamping dies, which pinch the inside and the outside of the pipe at the opposite positions thereon, is disposed at the same position as the fore-end of the split-desired portion from the edge of one end face of the cross section of the metal pipe, and the other end of one side of the clamping dies is disposed at the same position as the fore-end of the split-desired portion from the edge of one end face of the cross section of the metal pipe, or is disposed so that the metal pipe is supported at the same position as the edge face of the metal pipe. For a metal rod, one end of the clamping die that pinches the outer side of the metal rod is disposed at the same position as the fore-end of the split-desired portion from the edge of one end face edge on the metal rod cross section. In this way, the distance (length of incision) of the splitting part can be controlled by the position of the clamping dies that move to support or pinch the metal rod or the metal pipe. The disposing method of the clamping die will be specifically detailed in the description of embodiments, which will appear later, referring to the drawings.

As described above, the machining method of the present invention has been made on the basis of a new finding by the inventor of the present invention. The new finding is that the difficulty of machining the outer circumference of the cross section of the end of a metal rod or a metal pipe by the conventional method can be solved by applying the splitting method having the first to third features described previously, which can form smoothly and uniformly at least one of the deep groove, the deep recess, and the flange.

Next, the steps of the splitting method carried out by the machining by the present invention will be outlined. In the present invention, in order to deepen the splitting part (or to increase the splitting distance), the press-splitting by a slitting punch is continuously performed a large number of times on the periphery of the cross section of the end of the metal plate or the metal rod. The method of internal splitting of the present invention includes at least two processing steps described below.

The first step is a step such that the outside of the metal rod, or the outside and the inside of the metal pipe are pinched by clamping dies at two or more opposite portions thereof, and a cleft is formed on the periphery of the cross section of the edge of one end of the metal rod or metal pipe after abutting the slitting punch on the periphery of the cross section of the one end thereof. The second step is a step of advancing the splitting further by an operation of the press-splitting using the slitting-press at the cleft created in the first step, and this press-splitting operation is repeated once or twice or more times up to a predetermined range of the splitting distance (length or depth). In the first step and the second step, the position of the clamping die that pinches the outside of the metal rod, or the outside and the inside of the metal pipe at least two or more opposite positions thereof is moved in accordance with the distance from the end of one end face of the metal plate or the metal rod to the fore-end of the split-desired portion in advance at each press-splitting operation. In this moving step, it is preferable that the positioning in the moving should be adjusted in a manner in which one end of at least one side of the clamping dies that pinch the metal plate or the metal rod is positioned so that such part of the dies will sit at the approximately same position as the fore-end of the split-desired portion from the edge of the one end face of the metal plate or the metal rod. Thereby, the splitting distance on the end of the metal plate or the metal rod can be regulated within the predetermined range.

In the present invention, two or more splitting portions having different outer diameters can be formed on the periphery of the cross section of the end of the metal rod or the metal pipe by repeating at least above-mentioned first and second steps in each machining step, using two or more types of slitting punches having different outer diameters of their cutting edges used in splitting the outer circumference of the cross section of the metal end in the longitudinal direction of a metal rod or a metal pipe. In addition, when a slitting punch having a cutting edge at the tip the cross section of which is the same or partly same shape as the outline of the cross section of the end of any of the metal rod or the metal pipe, the drawn end of the metal rod or the metal pipe, and the hub hole forming part on the metal pipe is used, it is also possible to form two or more splitting portions having different outer diameters at different positions on the cross section of the end of the metal rod or the metal pipe.

Although no particular limitation is imposed on the material of the metal plate or the metal rod to which the machining method on the periphery of the end face of the cross section of the present invention is to be applied, copper, aluminum, stainless steel, brass, and iron are suitable for the reason that they have a wide applicable range and are capable of responding to high need for high added value metal components and at the same time to the reduction demand in manufacturing cost. In addition, metal harder than these metals, titanium and titanium alloy for example are also applicable.

Embodiments of a method for machining the outer circumference of an end of a metal rod or a metal pipe by the present invention will be described referring to the drawings, however the present invention is not limited to the following embodiments.

First Embodiment

Figure 1B:
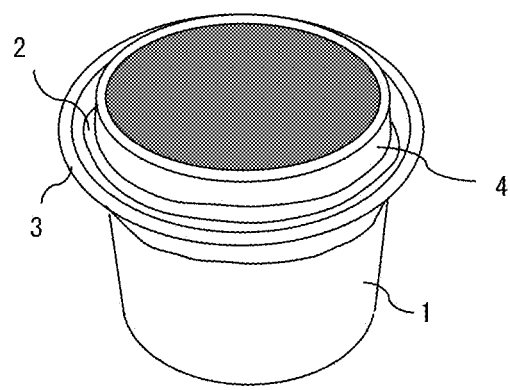

FIGS. 1A and 1B are external perspective views showing a metal pipe (material: copper, aluminum, iron, or brass) having a circular cross-sectional shape obtained after splitting the periphery of one end edge by the machining method of the present invention; FIG. 1A and FIG. 1B are the photograph of the external appearance and a schematically illustrated the perspective view, respectively. As FIG. 1B shows, a metal pipe 1 has a machined part 4 after splitting having a predetermined depth (length) together with a deep groove or a deep recess 2 and a flange 3, which are formed at the edge of one end thereof by a slitting punch in the longitudinal direction. When the deep groove 2 shown in FIG. 1B is formed widely, such a groove is expressed as a deep recess instead of a deep groove. It can be seen that the part corresponding to the worked part 4 after splitting has a smooth and uniform surface as shown in FIG. 1A.

Figure 2A:
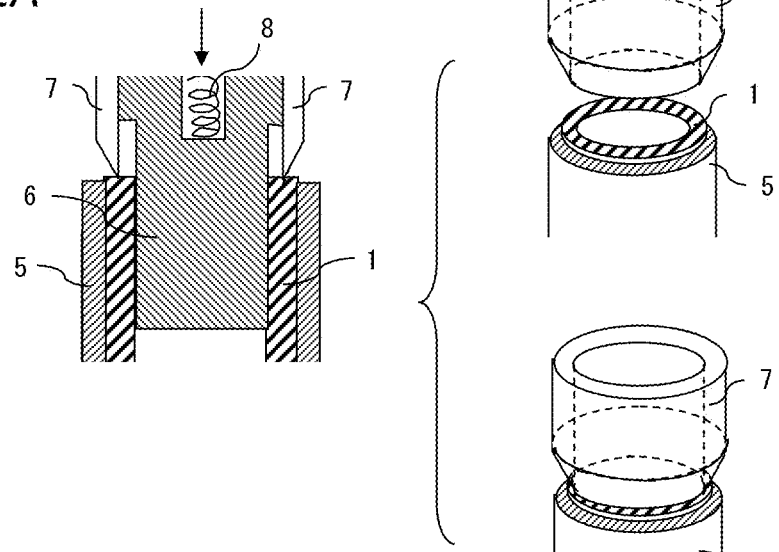
FIGS. 2A to 2C describe an example process in a machining method applied on a periphery of a cross section of a metal pipe end according to a first embodiment of the present invention.
Figure 2B:
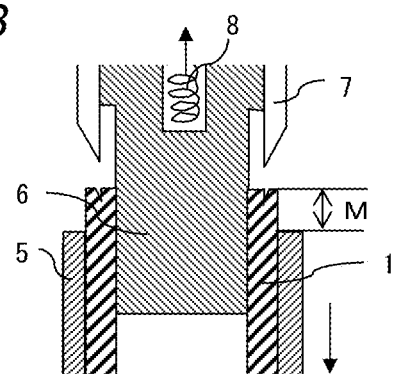
Figure 2C:
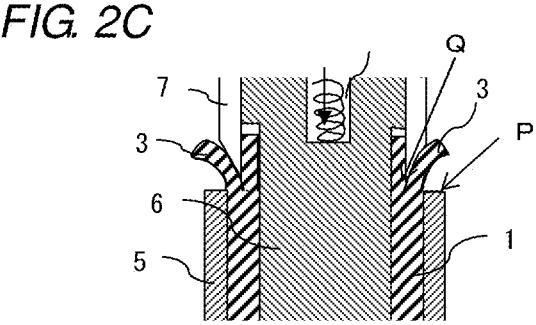

FIGS. 2A to 2C describe an example process in a machining method on the periphery of a cross section of a metal pipe end shown in FIGS. 1A and 1B. In FIGS. 2A to 2C, the illustration on the left side is a cross-sectional view and the one on the right side is a perspective view. As FIG. 2A to 2C illustrate, the machining method of the present embodiment is comprised of basically the steps: (a) The step to begin the first press-slitting; that is, pinching and fixing the metal pipe 1 so as to contact with whole circumferential surfaces of the inside and outside sides thereof using an outer clamping die 5 and an inner clamping die 6 arranged at the outer and inner opposite positions of the metal pipe 1, respectively, and then abutting a slitting punch 7 on the periphery of the cross section on the edge of one end of the metal pipe 1 to start the press-splitting (FIG. 2A), (b) The subsequent step; that is, moving the slitting punch upward (in the direction of arrow ↑) to release from the metal pipe, then, simultaneously or after that releasing, moving the outer clamping die 5 downward (arrow ↓) to the depth M of the slitting-intended part (FIG. 2B), and (c) Ensuing steps including the second step and successive press-splitting steps of performing press-splitting down to the depth M of the split-desired portion using the slitting punch 7 (FIG. 2C). When the depth M of the split-desired portion is desired to be deepened more, the steps shown in FIGS. 2B and 2C are to be repeated. Thereby, processing can be performed to a desired depth (distance). On completion of the press-splitting, the slitting punch 7 is moved to take out the metal pipe 1 machined. Finally, as shown in FIGS. 1A and 1B, the metal pipe 1 is given the machined part 4 having the predetermined depth (length), together with the deep groove or the deep recess 2 and the flange 3 after splitting. After that, if needed, at least one of the deep groove, the deep recess, and the flange subsequently undergoes a post-machining into a desired shape by performing the process of at least one of press forming, bending, cutting, edge trimming, and boring.

In the step shown in FIG. 2A, as illustrated in the perspective view on the right side, the shape of the cutting edge at the tip has the same circular shape as the sectional shape of the metal pipe 1, and the press-splitting is performed using a slitting punch 7 having an outer diameter smaller than the outer diameter of the cross section of the metal pipe 1, and abutting the slitting punch 7 on the periphery of the cross section thereof. Because the slitting punch 7 has a shape such that the inner cross section with respect to the radial direction of the metal pipe 1 has a linear part from the cutting edge at the tip toward the rear end of the base of the punch, the splitting process forms the flange 3 only on the outer side of the metal pipe 1 and the cross section of the inner side thereof is linear and flat. Further in the step shown in FIG. 2B, the slitting punch employs for example a spring 8 to allow an automatic vertical movement.

In the steps shown in FIGS. 2A to 2C, splitting on the periphery of the cross section of the edge of one end of the metal pipe 1 by the press-splitting with the slitting punch 7 is performed up to the same position as the one end P of the opening provided on the outer clamping die 5 that pinches the metal pipe 1, that is, down to the depth M. At the abutting part of the metal pipe 1 pinched by the outer clamping die 5, no cleavage occurs at the time of press-splitting by the slitting punch 7, because the compressive stress generated by pinching with the outer clamping die 5 and the inner clamping die 6 restrains destruction and cleavage in the metal structure of the metal to be machined. Therefore, by adjusting the installation position of the opening to be provided on the outer clamping die 5, the splitting distance (depth) can be freely regulated. That one end P of the outer clamping die 5 pinching the metal pipe 1 is on the same position as the fore-end Q of the split desired portion means that the one end P of the opening provided on the outer clamping die 5 is located at the point within −3 mm to +1 mm from the fore-end Q of the above-mentioned split desired portion, more preferably at the position within a range of −1 mm to +0.5 mm. The position of −3 mm means that, in FIG. 2C, the one end P of the opening of the outer clamping die 5 is located at the position 3 mm apart downward from the fore-end Q of the split desired portion. On the contrary, the position +1 mm means that the one end P is at a position 1 mm apart upward from Q and also means that the maximum distance of the growth of the splitting in the part pinched by the clamping die is within 1 mm from the position P. In this way, the outer clamping die 5 has a function that prevents the cleft growth in splitting.

Usually, when the pressure of the press-splitting is high or the speed of the splitting is high in press-splitting operation by pinching with the outer clamping die 5 and the inner clamping die 6, the positional deviation between the fore-end Q of the splitting part of the cross section of the end and the one end P of the outer clamping die 5 tends to become large. In that case, such behavior is not preferable not only because the adjustment of the length (or the depth) of the end-divided part becomes difficult but also because the deformation of the metal pipe 1 of a workpiece and occurrence of fine cracks at the fore-end of the splitting part easily take place. In addition, if the slit-forming pressure is too small or the splitting speed is too slow, the splitting is not sufficiently performed, and positional deviation from one end of the outer clamping die 5 becomes large. Further in that case, a problem arises in that the machining efficiency for splitting lowers. In the present invention therefore, it is necessary to perform the splitting with optimized pressure and speed of the press-splitting regulated for the reduced positional deviation between the fore-end Q of the split-desired portion and the one end P of the outer clamping die 5. In other words, by regulating one end of the outer clamping die 5 pinching the metal pipe 1 being at the same position as the fore-end of the split-desired portion, as a result, the optimizing conditions for the press-splitting that performs the splitting process in the machining the outer circumference of the cross section of the one end by the present invention can be specified. In this embodiment, the press-splitting is performed with the press load and the press load speed set within the range of 1 to 10 tons and 1 to 50 mm/s, respectively. Further, in consideration of the balance between the performance and the cost of the pressing apparatus, the press load and the press load speed are more preferably to be in the range of 2 to 5 tons and 2 to 10 mm/s, respectively.

Second Embodiment

Figure 3A:
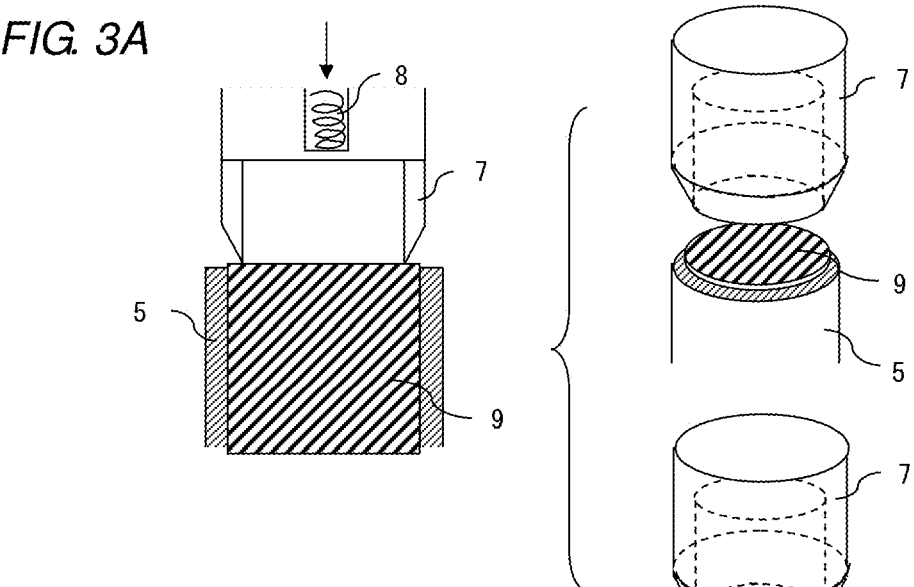
FIGS. 3A to 3C describe an example process of a machining method applied on a periphery of a cross section of a metal rod end according to a second embodiment of the present invention.
Figure 3B:
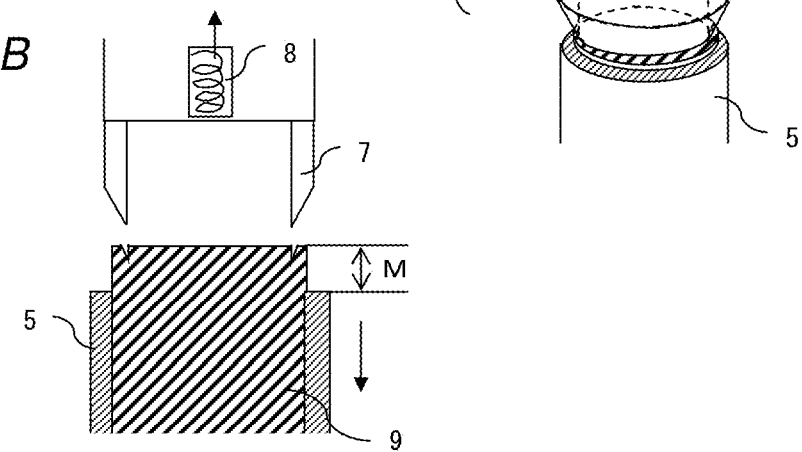
Figure 3C:
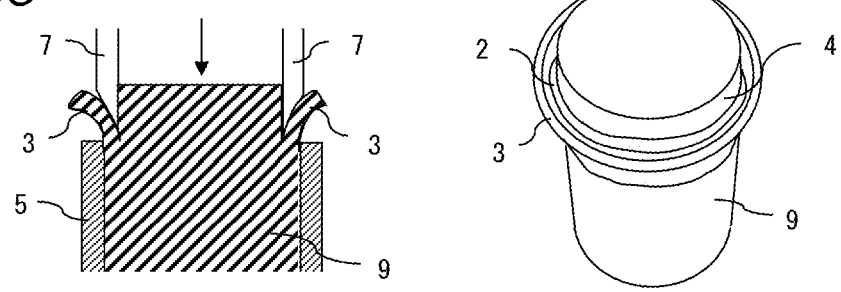

FIGS. 3A to 3C describe an example process of a method for machining the outer circumference of a cross section of an end of a metal rod using the metal rod as the workpiece to be processed. In FIGS. 3A to 3C, the illustrations on the left side are cross-sectional illustrations and the ones on the right side are perspective views. As FIGS. 3A to 3C illustrate, the machining method in the present embodiment is comprised of basically the steps: (a) The first step at start of press-splitting; that is, supporting and fixing the metal pipe 1 so as to contact with whole circumferential surfaces of the outside side thereof using the outer clamping die 5 arranged outside a metal rod 9, then abutting the slitting punch 7 on the periphery of the edge of the cross section of one end of the metal pipe 1 to begin the first press-splitting (FIG. 3A), (b) The subsequent step; that is, moving the slitting punch upward (in the direction of arrow ↑) to release from the metal rod, then, simultaneously or after that releasing, moving the outer clamping die 5 downward (arrow ↓) to the depth M of the split-desired portion (FIG. 3B), and (c) Ensuing steps including the second step and successive press-splitting steps of performing press-splitting down to the depth M of the split-desired portion using the slitting punch 7 (FIG. 3C). When the depth M of the split-desired portion is desired to be deepened more, the steps shown in FIGS. 3B and 3C are to be repeated. Thereby, the machining can be performed to a desired depth (distance). On completion of the press-splitting, the slitting punch 7 is moved to take out the metal rod 9 machined. Finally, as shown in the figure on the right side of FIG. 3(c), the metal rod 9 is given the worked part 4 having the predetermined depth (length), together with the deep groove or the deep recess 2 and the flange 3 after splitting. After that, if needed, at least one of the deep groove, the deep recess, and the flange subsequently undergoes a post-machining into a desired shape by performing the process of at least one of press forming, bending, cutting, edge trimming, and boring.

In the present embodiment, the object to be worked is the metal rod 9, a solid object. Therefore, the control of the depth M at the split-desired portion does not require use of an inner clamping die, unlike the metal pipe 1 in the first embodiment, and the depth control can be performed only by moving the outer clamping die 5.

In addition in the present embodiment, the slitting punch 7 has the same circular-shaped cutting edge at its tip as the sectional shape of the metal rod 9, and has a diameter smaller than that of the metal rod 9. As shown in the perspective view on the right side of FIG. 3A, the splitting process starts with abutting this slitting punch 7 on the periphery of the cross section of the metal rod 9. Because the slitting punch 7 has a shape such that the inner cross section with respect to the radial direction of the metal pipe 1 has a linear part from the cutting edge at the tip toward the rear end of the base of the punch, the splitting process forms the flange 3 only on the outer side of the metal rod 9.

Third Embodiment

FIGS. 4A to 4C describe another example process of a machining method on the periphery of a cross section of end of a metal pipe. The illustrations on the left side of FIG. 4 are cross sectional views and the illustrations on the right side are perspective views. As shown in FIGS. 4A to 4C, the machining method of the present embodiment is basically the same as the first embodiment except that the shape of the tip of a slitting punch 10 is different, but the processing steps are the same. In the slitting punch 10, as illustrated in the perspective views on the right side of FIG. 4A, both side faces of the cross section thereof extend from the cutting edge to the rear end (the base of the thick-row punch) in a tip-thinning tapered shape and the inside face is formed at an angle more acute compared to the outside. Further, the shape of the cutting edge at the tip is circular, the same shape as the cross section of the metal pipe 1, and its diameter is smaller than that of the cross section of the pipe.

The machining process shown in FIGS. 4A to 4C is comprised of basically the steps: (a) The step to begin the first press-splitting; that is, pinching and fixing the metal pipe 1 so as to contact with whole circumferential surfaces of the inside and outside sides thereof using an outer clamping die 5 and an inner clamping die 6 arranged at the outer and inner opposite positions of the metal pipe 1, respectively, and then abutting a slitting punch 7 on the periphery of the cross section on the edge of one end of the metal pipe 1 to start the press-splitting (FIG. 4A), (b) The subsequent step; that is, moving the slitting punch upward (in the direction of arrow ↑) to release from the metal pipe, then, simultaneously or after that releasing, moving the outer clamping die 5 downward (arrow ↓) to the depth M of the split-desired portion (FIG. 4B), and (c) Ensuing steps including the second step and successive press-splitting steps of performing press-splitting down to the depth M of the split-desired portion using the slitting punch 10 (FIG. 4C). When the depth M of the split-desired portion is intended to be deepened more, the steps shown in FIGS. 4B and 4C are to be repeated. Thereby, the machining can be performed to a desired depth (distance). On completion of the press-splitting, the slitting punch 10 is moved to take out the metal pipe 1 worked. Finally, the metal pipe 1 is given the deep groove or the deep recess 2, and the flange 3 having inward and outward brim portions of predetermined depth (length). After that, if needed, at least one of the deep groove, the deep recess and the flange subsequently undergoes a post-machining into a desired shape by performing the process of at least one of press forming, bending, cutting, edge trimming, and boring.

Fourth Embodiment

FIGS. 5A to 5D describe an example process of a machining method on the periphery of the cross section of a hub hole forming part on a metal pipe. In FIGS. 5A to 5D, the illustrations on the left side are cross-sectional views and the ones on the right side are perspective views of the hub hole forming part on the metal pipe before and after machining.

Figure 5A:
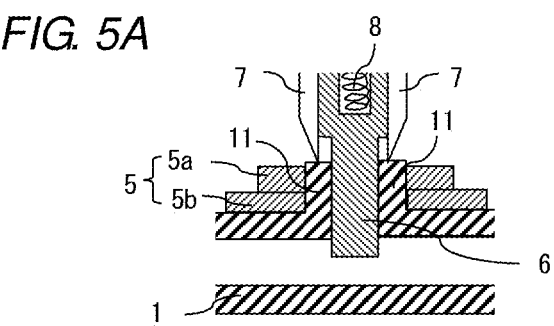
FIGS. 5A to 5D describe an example process of a machining method applied on a periphery of a cross section of a hub hole forming part on a metal pipe according to a fourth embodiment of the present invention.
Figure 5A:
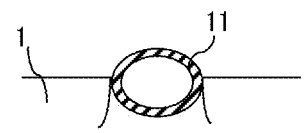

As FIGS. 5A to 5D illustrate, the machining process in the present embodiment is comprised of basically the steps of (a), (b), (c), and (d). As shown in FIG. 5A, (a) in the hub hole forming part on the metal pipe, first, pinching and fixing the metal pipe 1 by the outer clamping die 5 and the inner clamping die 6 each disposed at the facing positions outside and inside of an opening fore-end 11 formed in a predetermined hole (or bore) diameter, and then the slitting punch 7 is abutted on the periphery of the edge of the cross section of one end of the metal pipe 1 and begin the first press-splitting. In the figures, as an example of the outer clamping die 5, the illustrated is a configuration consisting of two pieces, an upper clamping die 5a and a lower clamping die 5b. Here, when each of the upper clamping die 5a and the lower clamping die 5b is made splittable, removing the clamping dies after machining by splitting method becomes easy.

Figure 5B:
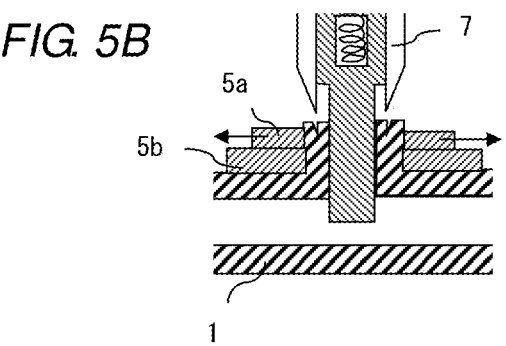

Next, as shown in FIG. 5B, (b) the slitting punch is moved upward (in the direction of arrow ↑) to release from the metal pipe, then, simultaneously or after that releasing, the upper clamping die 5a of the outer holding die 5 is removed.

In the present embodiment, the depth of the split-desired portion is regulated by the thickness of the upper clamping die 5a.

Figure 5C:
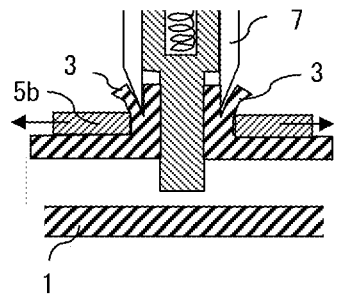
Figure 5D:
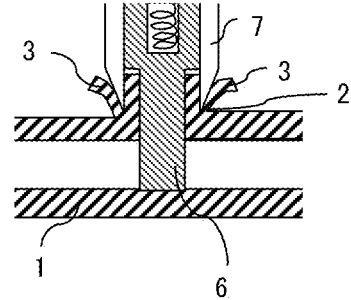
Figure 5D:
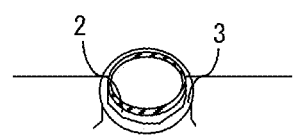

Then, as shown in FIG. 5C, (c) the press-splitting of second time is performed using the slitting punch 7 to the depth of the split-desired portion, that is, to the thickness of the upper clamping die 5a. After that, in order to machine the split-desired portion deeper, the lower clamping die 5b is removed. Successively, as shown in FIG. 5D, (d) the press-splitting of third time is carried out to form a split part deepened to the place near the outer surface of the metal pipe 1.

In the present embodiment, the outer clamping die 5 is not limited to the two-piece style composed of the outer holding die 5a and the lower holding die 5b, but may be composed of three or more pieces. In that case, the depth of the split-desired portion can be performed with fine increment, and the machining by splitting becomes easier to control. As another method to facilitate controlling of the depth of the split-desired portion, an outer clamping die movable up and down may be adopted instead of the outer clamping die 5a and the lower holding die 5b. In such case, the splitting can be achieved to the desired depth (distance) by repeating the steps of FIGS. 5B to 5D.

After completion of press-splitting performed in this way, the slitting punch 7 is moved and the hub hole forming part on the metal pipe after machining is taken out. Finally, the hub hole forming part on the metal pipe is formed as illustrated in a perspective view on the right side of FIG. 5D together with the flange 3 having a deep groove or a deep recess 2 which overhangs outward. After that, if needed, at least one of the deep groove, the deep recess and the flange subsequently undergoes a post-machining into a desired shape by performing the process of at least one of press forming, bending, cutting, edge trimming, and boring.

Fifth Embodiment

Figure 6A:
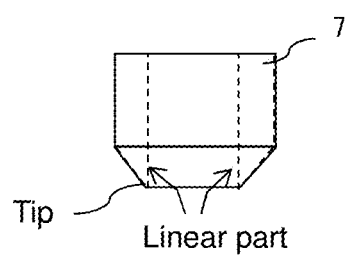
FIGS. 6A to 6D illustrate front and cross sectional views of a shape example of a slitting punch used in the machining method of the present invention.
Figure 6B:
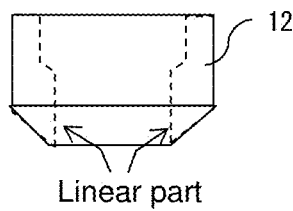
Figure 6C:
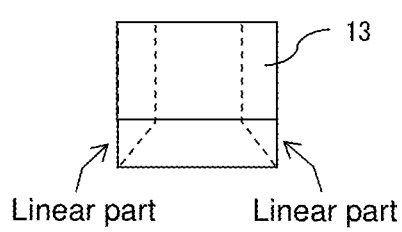
Figure 6D:
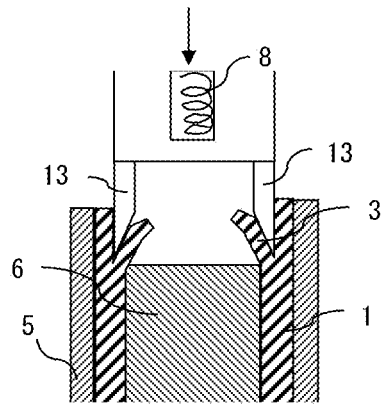

FIGS. 6A and 6D are front and cross sectional views illustrating an example of the shape of a slitting punch used in the method of machining the outer periphery of the cross section of the metal end according to the present invention. The specific shape of the slitting punch is indicated by a dotted line in the figure.

In FIGS. 6A and 6D, FIG. 6A shows an example of the slitting punch 7 having the same shape as that used in the first, second, and fourth embodiments. A slitting punch 12 shown in FIG. 6B has a step-shaped part in the intermediate part of the linear part inside thereof. The inner cross section of the slitting punch 12 with respect to the radial direction of a metal pipe or a metal rod, which is the object to be machined, has a linear part from the cutting edge at the tip toward the rear end (from the lower part to the upper part as in FIG. 6B) similarly in FIG. 6A, however, the linear part has a step-shaped part in the intermediate part thereof. The slitting punch used in the present invention does not need to be linear over the entire part from the tip toward the rear end, as long as it has a linear part from the cutting edge to the middle of the rear end part.

In addition, a slitting punch 13 shown in FIG. 6C has its linear part formed on the outside; this is the opposite side to the case of the slitting punch 7 shown in FIG. 6A. When the slitting punch 13 is used, the flange 3 is formed inside the metal pipe 1 by splitting as shown in FIG. 6D. Therefore, where the flange 3 is to be formed inside the metal pipe 1 and the subsequent post-machining is performed for a desired shape, a slitting punch illustrated in FIG. 6C is used.

Sixth Embodiment

Figures 7A, 7B:
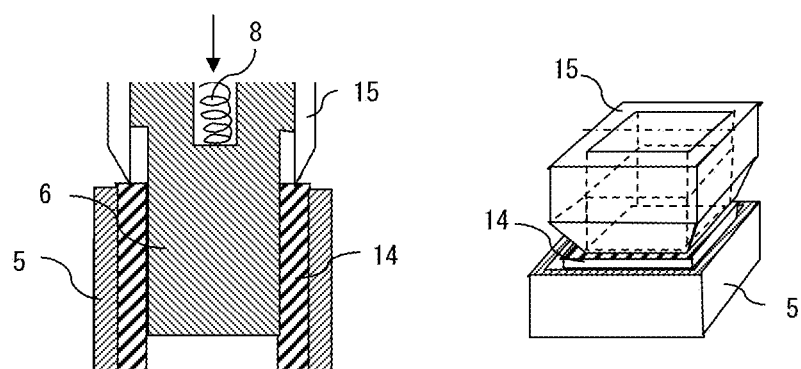
FIGS. 7A and 7B illustrate a part of a process example of a machining method applied on a periphery of a cross section of a metal pipe end having a rectangular outer diameter shape.

FIGS. 7A and 7B illustrate a part of a process example of a method for machining the periphery of the cross section of end of a metal pipe having an outer diameter shape of non-circular but a box shape such as a rectangular shape or a square shape; FIG. 7A is a cross sectional view and FIG. 7B is a perspective view thereof.

The machining step of a metal pipe 14 having a rectangular cross section illustrated in FIGS. 7A and 7B corresponds to the step shown in FIG. 2A. The subsequent steps are basically the same as those in FIGS. 2B and 2C except that the outer shape of the metal pipe is different. When further deepening the split-desired portion is intended, the same steps as those steps described in FIGS. 2B and 2C are to be repeated. Thereby, the machining by splitting can be performed to a desired depth (distance). After completion of the press-splitting, a process of moving a slitting punch 15 and taking out the machined metal pipe 14 is performed. Finally, similarly to the metal pipe 1 illustrated in FIGS. 2A to 2C, a splitting-machined part having a predetermined depth (length) is formed together with the deep groove or the deep recess and the flange 3 on the metal pipe 14 having the rectangular cross section. After that, if needed, at least one of the deep groove, the deep recess and the flange subsequently undergoes a post-machining into a desired shape by performing the process of at least one of press forming, bending, cutting, edge trimming, and boring.

Seventh Embodiment

Figure 8A:
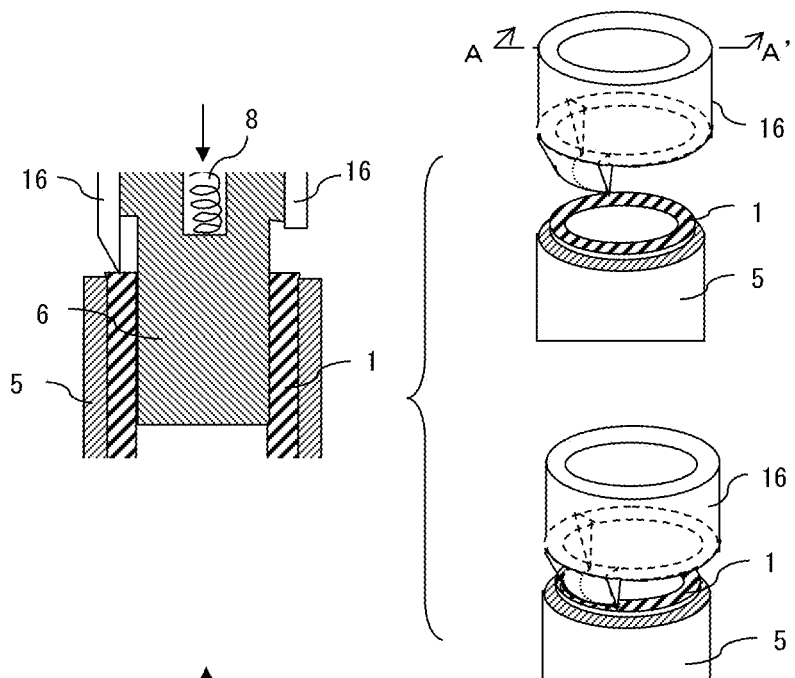
FIGS. 8A to 8C describe a process example of a machining method according to a seventh embodiment of the present invention in which the periphery of the cross section of a metal pipe end is partially split with a slitting punch the blade edge of which has another style of cross sectional shape.
Figure 8B:
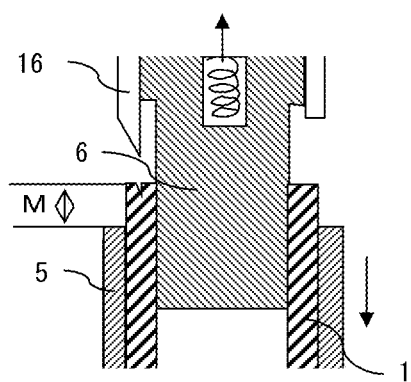
Figure 8C:
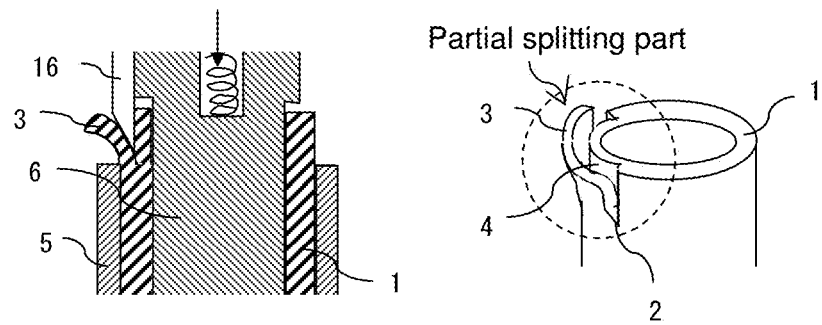

FIGS. 8A to 8C describe a process example of a machining method in which the periphery of end of a metal pipe having a circular cross section is partially machined with a slitting punch in which the shape of the cutting edge at the tip part is an approximate-quadrant. In FIGS. 8A to 8C, the illustration on the left side is a cross-sectional view of the position A-A' in the perspective view on the right side. As shown in FIGS. 8A to 8C, the machining method of the present embodiment is to split partially the periphery of the cross section of end of the metal pipe 1, and the method has basically the same process as that shown in FIGS. 2A to 2C except that the shape of the cutting edge at the tip of the slitting punch is different. That is to say, this method includes: (a) The step to begin the first press-splitting; that is, pinching and fixing the metal pipe 1 so as to contact with whole circumferential surfaces of the inside and outside sides thereof using an outer clamping die 5 and an inner clamping die 6 arranged at the outer and inner opposite positions of the metal pipe 1, respectively, and then abutting a slitting punch 16 on the periphery of the cross section on the edge of one end of the metal pipe 1 to start the press-splitting (FIG. 8A). (b) The subsequent step, that is, moving the slitting punch upward (in the direction of arrow ↑) to release from the metal pipe, then, simultaneously or after that releasing, moving the outer clamping die 5 downward (arrow ↓) to the depth M of the split-desired portion (FIG. 8B), and (c) Ensuing steps including the second step and successive press-slitting steps of performing press-splitting down to the depth M of the split-desired portion using the splitting punch 16 (FIG. 8C). When the depth M of the split-desired portion is desired to be deepened more, the steps shown in FIGS. 8B and 8C are to be repeated. Thereby, machining can be performed to the desired depth (distance). On completion of the press-splitting, the slitting punch 16 is moved to take out the machined metal pipe 1.

Finally, as shown in the illustration on the right side of FIG. 8C, the approximate-quadrant area (in the figure, the part surrounded by the dotted line) in the cross section of the metal pipe 1 is given the worked part 4 having the predetermined depth (length) together with the deep groove or the deep recess 2 and the flange 3 after splitting. After that, if needed, at least one of the deep groove, the deep recess, and the flange subsequently undergoes a post-machining into a desired shape by performing, only at the split-formed approximate-quadrant part, the process of at least one of press forming, bending, cutting, edge trimming, and boring.

In the present embodiment, the application of the partial splitting is not limited to an approximate-quadrant part in a circular cross section; that partial splitting is also applicable, as an optional matter within designing by a person skilled in the art, to any other shape such as a semicircle, as long as the shape forms a part of the sectional shape of the metal pipe 1. Further, the sectional shape of the metal pipe is not limited to a circular shape, and it may be a rectangle or an ellipse.

Figure 9A:
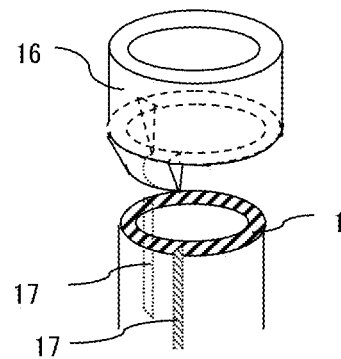
FIGS. 9A to 9C describe another process example of a machining method by partial splitting on the periphery of the cross section of a metal pipe end in a seventh embodiment of the present invention.
Figure 9B:
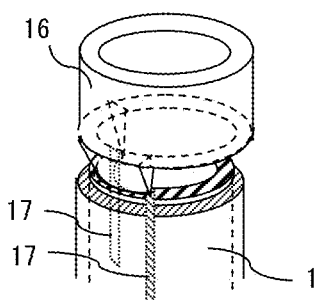
Figure 9C:
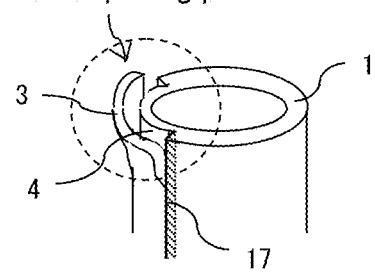

In the present embodiment, a notch or a scribe line may be provided in advance at positions corresponding to both sides of the periphery of the cross section of the metal pipe on which the slitting punch is abutted to allow the partial splitting as shown in FIGS. 9A to 9C. Thereby, the cleft created in the metal at the time of every press-splitting operation can be prevented from spreading to the part other than the part to which the slitting punch 16 is abutted.

First, as shown in FIG. 9A, a notch 17 is provided in advance at positions corresponding to both sides of the periphery of the cross section of the end of the metal pipe 1 on which the slitting punch 16 is to be abutted, wherein the cutting edge at the tip of the slitting punch 16 has such a shape as is an approximate-quadrant. Although the depth of a notch 16 is not particularly limited, it is practical to make the depth similar to the thickness of the splitting part on the periphery of the cross section of the end of the metal pipe. Next, as shown in FIG. 9B, the slitting punch 16 is abutted at the periphery of the cross section of the end of the metal pipe 1 to perform the first press-splitting. FIG. 9B shows only the first press-splitting step; in the present embodiment, the metal pipe 1 undergoes the partial-splitting down to the desired depth (distance) through basically the same process as those shown in FIGS. 8B and 8C. On completion of the press-slitting, the slitting punch 16 is moved to take out the machined metal pipe 1.

In this way, as shown in FIG. 9C, the machined part 4 after splitting having a predetermined depth (distance) is formed in the approximate-quadrant area (in the figure, the part surrounded by the dotted line) in the cross section of the metal pipe 1, together with the deep groove or deep recess 2 and the flange 3. After that, if needed, at least one of the deep groove, the deep recess, and the flange subsequently undergoes a post-machining into a desired shape by performing, only at the periphery of the split approximate-quadrant part, the process of at least one of press forming, bending, cutting, edge trimming, and boring.

In the process shown in FIGS. 9A to 9C, the notch 17 is provided in order to prevent the cleft created in the metal at the time of the press-splitting operation from spreading beyond the place where the slitting punch 16 is abutted. In this embodiment however, a scribe line may be marked on the same place instead of the notch 17. Marking the scribe line also has the effect that the slitting punch 16 can easily be positioned for abutting.

Eighth Embodiment

Next, a machining method on the periphery of the cross section of one end of the metal rod or metal pipe of the present invention with an increased mass-productivity in each of the above-described first to seventh embodiments is described.

The machining method of the present invention is a method of splitting the periphery of the edge of the cross section of one end of a metal pipe or a metal rod. In each of the machining steps shown in FIGS. 1 to 9, when the periphery of the cross section of any one of end of a metal pipe, a drawn end, and a hub hole forming part is to be machined, the position of the clamping die on at least one side of the clamping dies that pinch the inside and the outside of the metal pipe is moved in advance, in accordance with the distance (stroke) from the edge of one end face of the metal pipe to the fore-end of the split-desired portion; on the other hand, when the periphery of the cross section of any of the end of the metal rod and the drawn end of the metal rod is to be machined, after moving one end of the clamping die that pinches the outside of the metal rod in accordance with the distance (stroke) from the edge of one end of the cross section of the metal rod to the split-desired portion, the process for splitting the periphery of the edge of the cross section of one end of the metal rod or the metal pipe is carried out as one processing step, continuously and automatically to progress the splitting the periphery of end finally to the predetermined depth (or distance). In addition, as an alternative to moving the clamping die in this method, moving the metal rod or the metal pipe corresponding to the metal material to be machined by a predetermined stroke continuously and automatically, may be practicable to perform the splitting process continuously in one way. In this, the position of the slitting punch before press-splitting is regulated to a predetermined position by automatic control with a computer using a position sensor. Likewise, the clamping die pinching at least one of the outside and the inside is also automatically controlled and moved to a predetermined position. In addition, as described above, when it becomes necessary to change the press-splitting conditions in accordance with the change in the splitting distance, the move of the clamping die, the tightening and pinching conditions by the clamping die, and press-splitting conditions can be continuously and automatically controlled with a computer or similar devices by grasping in advance the relationship between the splitting distance and the press-splitting conditions.

Figure 10A:
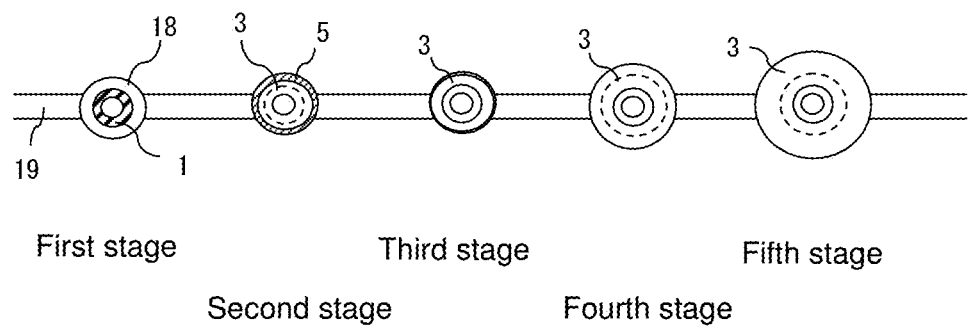
FIGS. 10A and 10B describe a process example of the method for machining the outer circumference of the cross section of a metal pipe end to be carried out in a progressive transfer method shown in an eighth embodiment of the present invention.
Figure 10B:
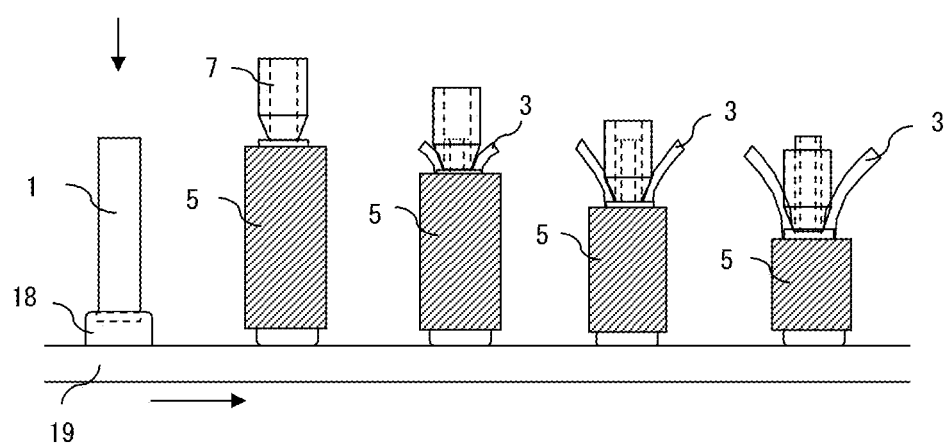

As another internal splitting method by continuous press-splitting, a progressive transferring method can be listed, wherein the press-splitting steps shown in FIGS. 1 to 9 are separated individually and arrayed in a tandem line to carry out the multiple press-splitting processes sequentially. An example of the method of splitting the periphery of the cross section of one end with this progressive transferring method is described referring to FIGS. 10A and 10B. The machining method shown in FIGS. 10A and 10B is an example of performing the press-slitting using the slitting punch 7 shown in FIGS. 2A to 2C. In the processing steps in the method of splitting the periphery of the cross section of end of the metal pipe 1 shown in FIGS. 10A and 10B, FIG. 10A and FIG. 10B are a plan view and a front view, respectively. In FIGS. 10A and 10B, FIG. 10A is a view of the edge of one end of the metal pipe 1 shown in FIG. 10B when viewed in the arrow-indicated direction (↓), wherein the slitting punch 7 is not shown.

As shown in FIGS. 10A and 10B, the metal pipe 1 is mounted on a fixing table 18 at the first stage. The fixing table 18 is coupled to a moving stage 19 on a belt conveyor system. Next, the metal pipe 1 mounted is transferred to the second stage with the moving stage 19. The outer clamping die 5 for pinching the outside of the metal pipe 1 is disposed at a predetermined position and pinches the metal pipe 1 from both sides jointly with an inner clamping die (not shown). Then, the first press-splitting is performed using the slitting punch 7. After that, the slitting punch 7 is moved from the metal pipe 1 machined, which is followed by releasing the inner clamping die and the outer clamping die 5. Then, the metal pipe 1 is transferred to the third stage, and the outer clamping die 5 for pinching the outside of the metal pipe 1 is disposed at a predetermined position similarly to the second stage. After that, the second press-splitting is performed using the slitting punch 7. The splitting is further performed deeper at the third stage. Following that, the slitting punch 7 is moved from the machined metal pipe 1 and the inner clamping die and the outer clamping die are released. Successively, the metal pipe 1 is transferred to the fourth and the fifth stages in a progressive manner, then, the outer clamping die 5 is disposed at a position in accordance with the slit-desired depth (or distance) and pinches the metal pipe 1 jointly with the inner clamping die (not shown). Thereafter, the machining on the periphery of the cross section of the end of the metal pipe 1 is progressed by repeating the press-splitting. Although only the processes up to the fifth stage are shown in FIGS. 10A and 10B for convenience; in the present invention however, it is possible to change the number of splitting stages depending on the splitting distance per one splitting-step and the final split-desired distance. That is, the total count of stages after the fifth stage can be also determined appropriately.

As described above, by performing press-splitting using slitting punch in one direction or continuously in a progressive transfer method with a predetermined stroke, it is possible to construct an internal splitting method at a cross section of one end having excellent mass productivity and, at the same time, reduced manufacturing cost.

Ninth Embodiment

The following describes, referring to drawings, a method of manufacturing metal components having any one of a deep groove, a deep recess, and a flange each in a desired shape on the outer periphery of the cross section of metal end; such desired shapes are given by applying a post-machining after performing the machining method of the present invention. In the post-machining, at least one of press forming, bending, cutting, edge trimming, and boring is applied.

FIGS. 11A to 11D are views for describing an example of the post-machining for flanging by bending in manufacturing a metal component. In FIGS. 11A to 11D, the drawing on the left side is a sectional view and the drawing on the right side is a perspective view.

Figure 11A:
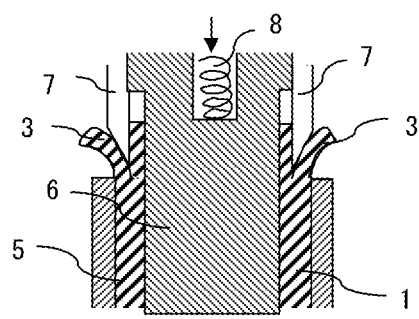
FIGS. 11A to 11D describe a manufacturing process of a metal component produced by bending the flange in a ninth embodiment of the present invention.
Figure 11B:
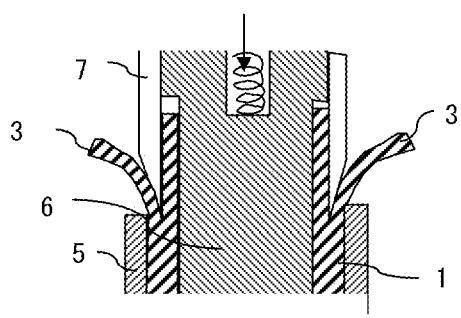
Figure 11C:
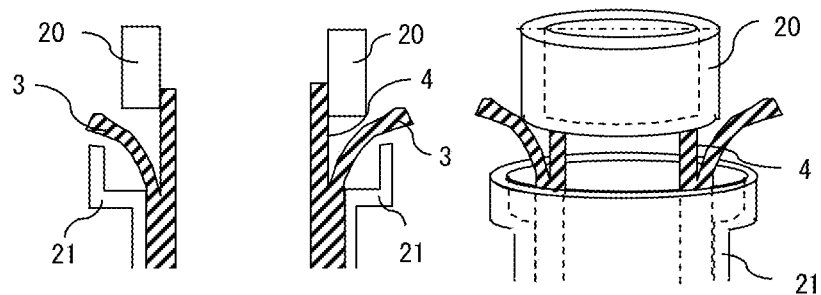
Figure 11D:
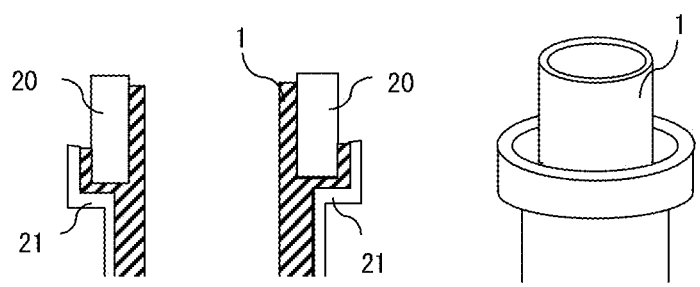

First, the press-splitting is performed on the periphery of the cross section of end of the metal pipe 1 multiple times to proceed the splitting process in the basically same machining manner as the one shown in FIGS. 2A and 2B using the slitting punch 7 (FIGS. 11A and 11B). Thereafter, the slitting punch 7 is moved, the outer clamping die 5 and the inner clamping die 6 are released, and the machined metal pipe 1 is taken out. Then, using the metal pipe 1 after the splitting processing, a hollow press die 20 of a circular cross section having an outer diameter and an inner diameter is inserted into the machined part 4 after splitting, and press forming is performed. At this time, an outer shape-keeping clamping die 21 for determining the external shape and dimensions of the flange 3 after machining is disposed around the flange of the metal pipe 1 (FIGS. 11C and 11D). Here, the hollow press die 20 is designed so that its inner diameter is same as or slightly larger than the outer diameter of the worked part 4 after splitting of the metal pipe 1. On the other hand, the outer diameter of the hollow press die 20 is designed to be same as or slightly smaller than the inner-shape dimension of the flange 3 after machining.

Thereafter, the hollow press die 20 and the external shape-keeping clamping die 21 are released and a metal pipe 1 having the flange 3 of L-shape bent as shown in the perspective view on the right side of FIG. 11D is obtained.

FIGS. 12A to 12D are views for explaining a manufacturing process of a stepped columnar metal member as an example the post-machining. In FIGS. 12A to 12D, the drawing on the left side is a sectional view and the drawing on the right side is a perspective view.

Figure 12A:
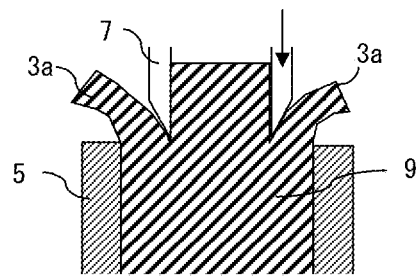
FIGS. 12A to 12D describe a manufacturing process of a stepped columnar metal part in the ninth embodiment of the present invention.
Figure 12B:
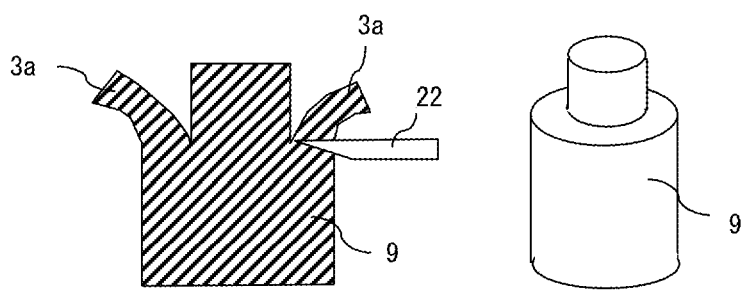
Figure 12C:
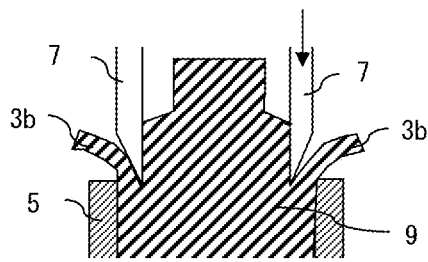

First, by the process basically same as the process shown in FIGS. 3B to 3C, the periphery of the cross section of the end of the metal rod 9 undergoes press-splitting with the slitting punch 7 multiple times, and the splitting process is progressed (FIG. 12A). Thereafter, the slitting punch 7 is moved, the outer clamping die 5 is released, and the metal rod 9 processed is taken out. Then, while rotating the metal rod 9, the cutter 22 is abutted at the base part of a flange 3a, and the flange 3a is cut away (FIG. 12B). The metal rod 9 manufactured by this process has a shape as shown in the perspective view on the right side of FIG. 12B.

Figure 12D:
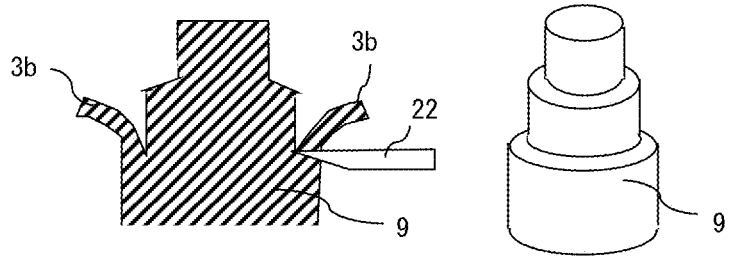

Following that, the outer clamping die 5 is shifted by the split-desired distance around the metal rod 9 the flange 3a of which has been cut away, and the splitting process on the peripheral of the metal rod 9 is performed using the slitting punch 7. In the machining by the splitting, press-splitting is repeated while moving the outer clamping die 5 downward (FIG. 12C) until a desired splitting depth (distance) is obtained. Thereafter, the slitting punch 7 is moved, the outer clamping die 5 is released, and the metal rod 9 after machining is taken out. Then, while rotating the metal rod 9, a cutter 22 is abutted at the base part of a flange 3b, and the flange 3b is cut away (FIG. 12D). In this manner, as shown in the perspective view of on the right side of FIG. 12D, a two-shoulder stepped columnar metal member is manufactured.

FIGS. 12A to 12D show a manufacturing process of a two-shoulder stepped columnar metal member; in the present embodiment however, the number of steps is not limited to two, but three or more steps of stepped-shape may be formed. In addition, the orientation of shape of the end of each step is not limited to obliquely upward direction, but can be formed horizontally or obliquely downward by selecting the shape of the cutter 22.

Tenth Embodiment

The following describes, referring to drawings, a method of joining a member prepared by the machining method of the present invention to other member made of different or same material. The member prepared by the machining method of the present invention has, on its outer periphery of the cross section of the metal end, any of deep groove, deep recess, and flange; the other member is made of material selected from the group consisting of metal, plastic, ceramic, glass, and wood. Such other member is inserted between at least any of the deep groove, deep recess, and flange of the member prepared by the machining method of the present invention, then they are joined each other. The method of joining the metal rod or the metal pipe having at least one of the deep groove, the deep recess, and the flange, and the other member to each other may employ any one of method of press, welding, fusion, bolt fastening, rivet fastening, and glue.

FIGS. 13A to 13D are views for describing the joining step when the metal pipe 1 the flange of which is bent into an L-shape by the process shown in FIGS. 11A to 11D is joined to a metal pipe to be used as the other member. In FIGS. 13A to 13D, the drawing on the left side is a cross sectional view and the drawing on the right side is a perspective view.

Figure 13A:
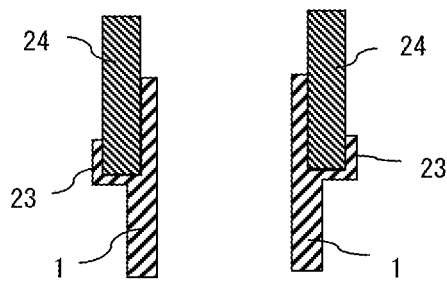
FIGS. 13A to 13D describe a process of joining a metal pipe 1 having an L-shape bent flange with another member in a tenth embodiment of the present invention.
Figure 13B:
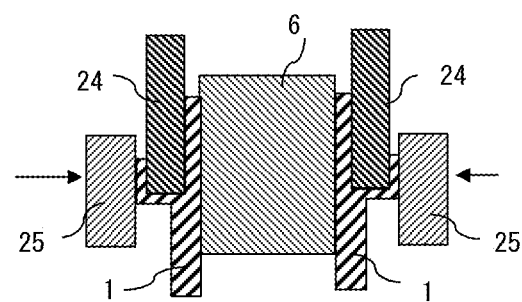
Figure 13C:
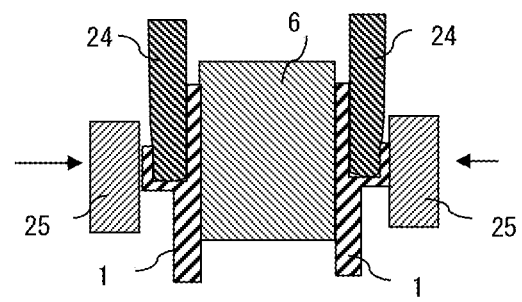
Figure 13D:
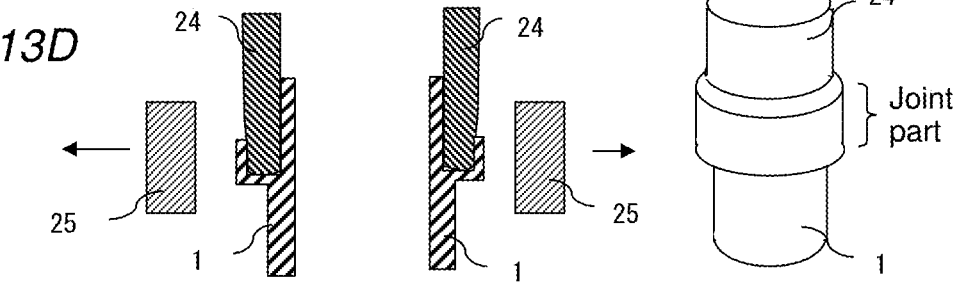

First, another metal pipe 24 is inserted into an L-shape bent part 23 of the flange on the metal pipe 1 (FIG. 13A). Then, the press forming begins uniformly at the insertion part of the other metal pipe 24 using a press die 25 from the outer periphery of the metal pipe 1 (FIG. 13B). The press forming is further performed swaging the insertion part of the other metal pipe 24 until the part shows a slight deformation (FIG. 13C); and then the press die 25 is moved to be released (FIG. 13D). By the above-mentioned method, as shown in the perspective view on the right side of FIG. 13D, a metal member in which the metal pipe 1 and the other metal pipe 24 are joined is manufactured.

FIGS. 13A to 13D show an example in which the metal pipe 1 and the other metal pipe 24 are joined by swaging. In order to improve the joining strength between both the metal pipes however, an area around the insertion part of the other metal pipe 24 may be TIG welded or laser welded additionally. Or alternatively, omitting the swaging after the process shown in FIG. 13A, the periphery of the insertion part of the other metal pipe 24 may be welded. Further instead, after forming at least one of a hole, and bore or a flat part to permit bolting or riveting on a part of the joint part of the metal pipe 1 and the other metal pipe 24, the both metal pipes may be bolted or riveting.

FIGS. 14A to 14D are views for describing a process of joining another member to the hub hole forming part on the metal pipe manufactured by the process shown in FIGS. 5A to 5D. In FIGS. 14A to 14D, the drawing on the left side is a sectional view and the drawing on the right side is a perspective view.

Figure 14A:
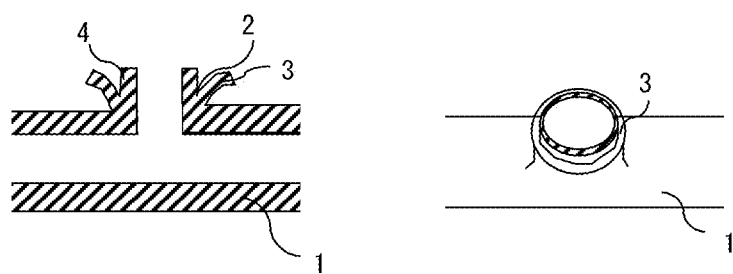
FIGS. 14A to 14D describe a process of joining a hub hole forming part on a metal pipe with another member in the tenth embodiment of the present invention.
Figure 14B:
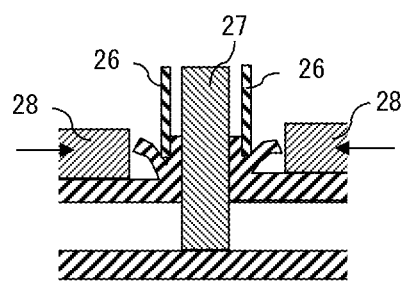
Figure 14C:
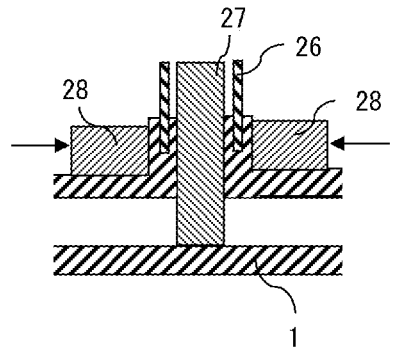
Figure 14D:
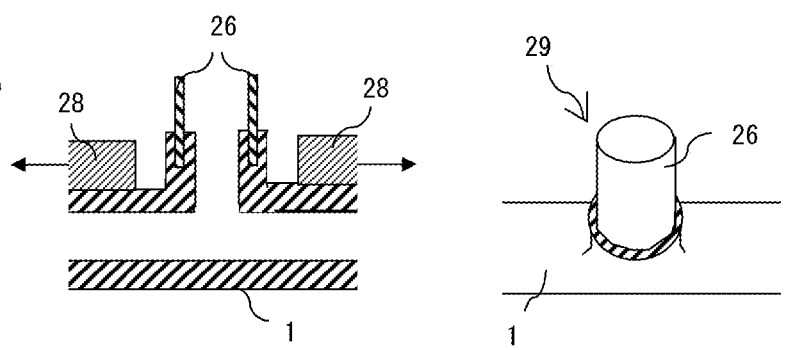

First, by the process shown in FIGS. 5A to 5D, the machined part 4 after splitting is formed on the cross section of the fore-end of the opening of the hub hole forming part on the metal pipe 1 in addition to the deep groove or the deep recess 2, and the flange 3 (FIG. 14A). Next, another metal pipe 26 is inserted between the flange 3 and the worked part 4 after splitting, and then an inner clamping die 27 is set; thereafter, the press forming begins from the outside of the periphery of the flange 3 using a press die 28 (FIG. 14B). Further, the press forming is advanced to swage the insertion part of the other metal pipe 26 (FIG. 14C, and then the inner clamping die 27 and the press die 28 are moved to be released (FIG. 14D). By the method stated above, a T-shaped metal member 29 in which the fore-end of the opening of the hub hole forming part on the metal pipe 1 and the other metal pipe 26 are joined is obtained as shown in the perspective view on the right side of FIG. 14D.

FIGS. 14A to 14D show an example in which the metal pipe 1 and the other metal pipe 26 are joined by swaging. In order to improve the joining strength between both the metal pipes however, an area around the insertion part of the other metal pipe 26 may be TIG welded or laser welded. Or alternatively, omitting the swaging after the process shown in FIG. 14A, the periphery of the insertion part of another metal pipe 25 may be welded. Further instead, after forming at least one of a hole, and a bore or a flat part to permit bolting or riveting on a part of the joint part of the metal pipe 1 and the other metal pipe 26, the both metal pipes may be joined with bolting or riveting.

FIGS. 15A to 15D are illustrations for describing the joining step when the metal pipe the flange of which is bent into an L-shape by the process shown in FIGS. 11A to 11D is joined to plastic used as the other member. In FIGS. 15A to 15D, the drawing on the left side is a sectional view and the drawing on the right side is a perspective view.

Figure 15A:
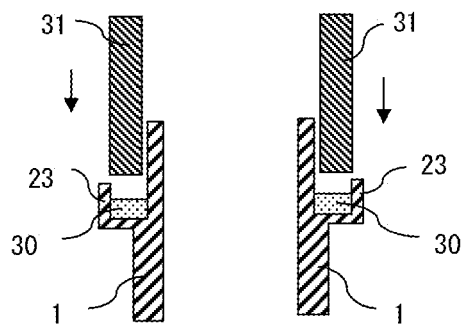
FIGS. 15A to 15D describe a process of joining a metal pipe having an L-shape bent flange with another member by gluing in the tenth embodiment of the present.
Figure 15B:
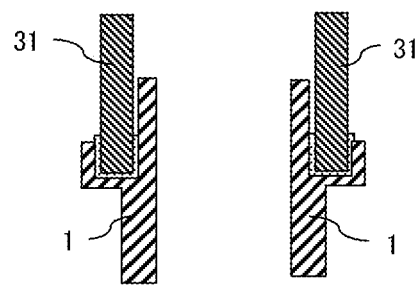
Figure 15C:
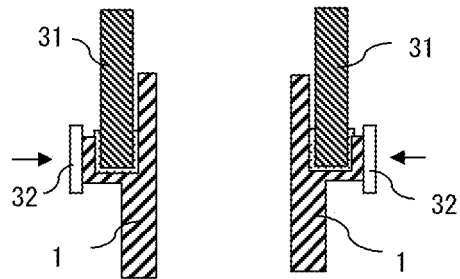

First, glue 30 of a silicone resin type, epoxy resin type, or acrylic resin type is injected into the recess on the L-shape bent part 23 of the flange of the metal pipe 1 (FIG. 15A), and thereafter another plastic member 31 is inserted (FIG. 15B). Then, the inserted part of the plastic member 31 is uniformly compression-formed from the outer periphery of the metal pipe 1 using a fastening member 32 (FIG. 15C). Here, as the fastening member 32, tape materials such as compressed tapes, bands, and hollow-dies having cross sections of circular, rectangular, or elliptic can be listed. Where a hollow die is used, a contrivance such that the pressure is loaded from the outside of periphery of the metal pipe 1 should be provided. Further, when heating is needed for the joint part covered with the fastening member 32 in order to expedite the curing of the glue 30, a heater for heating may be incorporated in the fastening member 32. In addition to this, it is also practicable to employ a method in which the whole of the metal pipe 1 and the other metal pipe 31 are placed in a thermostatic oven to be heated.

Figure 15D:
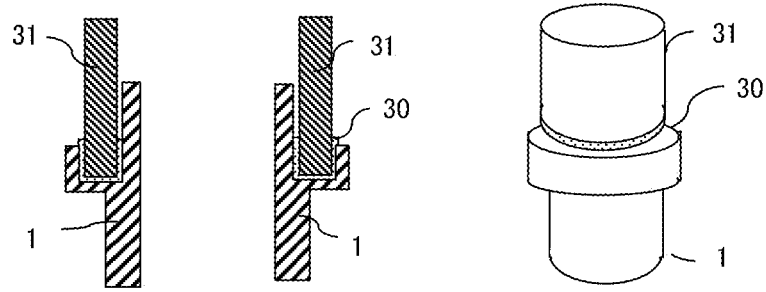

Next, the fastening member 32 is released from the joint part of the metal pipe 1 (FIG. 15D). By the above-mentioned method, a member in which the metal pipe 1 and the plastic member 31 are joined can be manufactured, as shown in the perspective view on the right side of FIG. 15D. The joint part obtained by the method shown in FIGS. 15A to 15D has a structure in which the plastic member 31 is sandwiched in the L-shape bent part 23, the stress generated by the difference in thermal expansion coefficient tends to decrease. Therefore, it is possible to improve the reliability and durability of the joint part even in joining dissimilar kinds of materials such as metal and plastic. In FIGS. 15A to 15D, a plastic member is used as an example of another member. However, in this embodiment, the other member such as ceramic, glass, wood, or the like may be used instead of the plastic member 31.

As described above, the method of machining on the outer periphery of the cross section of the metal end by the present invention employs a splitting method that uses a slitting punch having a new structure and shape; thereby, the method is able to process easily the periphery of the cross section of any of the end of a metal rod or a metal pipe, the drawn end of a metal rod or a metal pipe, and the hub hole forming part on a metal pipe, and is further able to adjust the splitting length (or depth) within a desired range. Therefore, the invented method is able to form smoothly and uniformly at least one of the deep groove, deep recess, and flange having freely controlled depth or length in the longitudinal direction of the metal rod or metal pipe.

Further, metal components manufactured by the machining method on the outer periphery of the cross section of metal end by the present invention are easy in positioning with another member selected from the group consisting of metals, plastics, ceramics, glass, and wood. The invented method therefore allows joining with ease by a simple operation. Further, by adding any method of pressing, welding, fusing, bolting, riveting, and glue to the above-mentioned positioning part, it is possible to achieve a significant improvement in the reliability and durability of joining between metal component and other members.

As described above, since the machining method of the present invention is able to easily manufacture components and members widely applicable to various fields, the usefulness of the present invention is extremely high.

The invention claimed is:

1. A method for machining an outer circumference of a cross section of any of an end of a metal rod or a metal pipe, a drawn end of a metal rod or a metal pipe, and a hub hole forming part on a metal pipe by a splitting method using a slitting punch to form at least any one of a deep groove, a deep recess, and a flange on a periphery thereof, the method comprising:

a tip of the slitting punch has a sharp cutting edge of the same or partly same outline as the cross section of the end of any of the metal rod or the metal pipe, the drawn end of the metal rod or the metal pipe, and the hub hole forming part on the metal pipe, wherein a diameter of the slitting punch is smaller than an outer diameter of the cross section of a splitting object; and the method includes the processing operations of:

abutting a splitting punch on a position on the periphery of the cross section of the end of any of the metal rod or the metal pipe, the drawn end of the metal rod or the metal pipe, and the hub hole forming part on the metal pipe to form a cleft; and advancing further a slitting in a longitudinal direction of the metal rod or the metal pipe by repeating the press-splitting method by the slitting punch at the cleft for further or repeatedly one or two or more times;

wherein, when machining the outer circumference of the cross section of any one of the end of the metal pipe end, the drawn end thereof, and the hub hole forming part thereon, a depth of the cleft created in the metal by a press-splitting each time of the press-splitting method is adjusted in advance by disposing one end of one side of a set of clamping dies, which pinch the inside and the outside of the metal pipe at opposite positions in a state of contacting with whole circumferential surfaces of both the inside and the outside thereof, at the same position as a fore-end of a split-desired portion from an edge of one end face of the metal pipe, and by disposing one side of the other side of the set of clamping dies at the same position as the fore-end of a split-desired portion from the edge of one end face of the metal pipe, or at the same position as the edge of the end face of the metal pipe so as to support the metal pipe, when machining the outer circumference of the cross section of any one of the metal rod end and the drawn end of the metal rod, and the depth of the cleft created in the metal by the press-splitting each time of the press-splitting method is adjusted in advance by disposing one end of the clamping die, which pinches the outside of the metal rod in a state of contacting with whole circumferential surface of the outside thereof, at the same position as the fore-end of a split-desired portion from the edge of the one end face of the metal rod.

2. The method for machining the outer circumference of the cross section of the metal end according to claim 1 to form partially at least any one of a deep groove, a deep recess, and a flange on the periphery thereof, the method comprising:

a press-splitting is performed, using a slitting punch formed to have a diameter smaller than the outer diameter of the cross section of the splitting object, on the periphery of the cross section of one of the metal rod end or the metal pipe end, the drawn end of the metal rod or the metal pipe, and the hub hole forming part on the metal pipe, wherein a cutting edge of the slitting punch has the partially same shape as a cross-sectional outline of any one of the end of the metal rod or the metal pipe, the drawn end of the metal rod or the metal pipe, and the hub hole forming part on the metal pipe; and, when forming at least one of the deep groove, the deep recess and the flange, a notch or a scribe line is provided in advance at positions corresponding to both sides of the periphery of the cross section of the metal pipe on which the slitting punch is abutted to partially form at least one of the deep groove, the deep recess, and the flange on the periphery of the cross section, preventing the cleft created in metal at the time of the press-splitting from spreading to the part other than the part to which the slitting punch is abutted.

3. The method for machining the outer circumference of the cross section of the metal end according to claim 2, the method comprising:

at least one of the deep groove, the deep recess, and the flange is processed into a desired shape by performing a process of at least one of press forming, bending, cutting, edge trimming, and boring after the splitting method for forming at least one of the deep groove, the deep recess, and the flange.

4. The method for machining the outer circumference of the cross section of the metal end according to claim 1, the method comprising: the cutting edge of the slitting punch has such a shape that the cross section with respect either to an inner side or to an outer side in a radial direction of the metal pipe or the metal rod has a linear part from the tip toward a rear end.

5. The method for machining the outer circumference of the cross section of the metal end according to claim 4, the method comprising:

at least one of the deep groove, the deep recess, and the flange is processed into a desired shape by performing a process of at least one of press forming, bending, cutting, edge trimming, and boring after the splitting method for forming at least one of the deep groove, the deep recess, and the flange.

6. The method for machining the outer circumference of the cross section of the metal end according to claim 1, the method comprising:

dividing by the splitting in the longitudinal direction with respect to a metal plate or the metal rod on the periphery of the cross section of one of the metal rod end or the metal pipe end, the drawn end of the metal rod or the metal pipe, and the hub hole forming part on the metal pipe, and advancing further such dividing by the splitting;

wherein each press-splitting operation by the slitting punch is carried out in a progressive transfer method consisting of operations separated from each other;

when machining the outer circumference of the cross section of one of the metal pipe end, the drawn end, and the hub hole forming part, a position of at least one side of the clamping dies that pinch the inside and the outside of the metal pipe is moved in advance at each process of press-splitting in accordance with a distance from the edge of one end face of the cross section of the metal pipe to the fore-end of the split-desired portion; and, when machining the outer circumference of the cross section of one of the metal rod end and the drawn end of the metal rod, one end of the clamping die that pinches an outer side of the metal rod is moved in accordance with the distance from the edge of one end face of the cross section of the metal rod to the fore-end of the split-desired portion.

7. The method for machining the outer circumference of the cross section of the metal end according to claim 6, the method comprising:

at least one of the deep groove, the deep recess, and the flange is processed into a desired shape by performing a process of at least one of press forming, bending, cutting, edge trimming, and boring after the splitting process for forming at least one of the deep groove, the deep recess, and the flange.

8. The method for machining the outer circumference of the cross section of the metal end according to claim 1, the method comprising:

at least one of the deep groove, the deep recess, and the flange is processed into a desired shape by performing a process of at least one of press forming, bending, cutting, edge trimming, and boring after the splitting method for forming at least one of the deep groove, the deep recess, and the flange.

9. A method for joining a metal component with another member, the method comprising:

inserting said another member between at least any of a deep groove, a deep recess, and a flange formed on an outer periphery of a cross section thereof, wherein said another member is made of material selected form the group consisting of metal, plastic, ceramic, glass, and wood; and joining said inserted another member to a metal rod or a metal pipe having at least one of the deep groove, the deep recess, and the flange by any of method of pressing, welding, fusing, bolting, riveting and glue;

wherein a machining method of an outer circumference of the cross section comprises:

a tip of a slitting punch has a sharp cutting edge of the same or partly same outline as the cross section of the end of any of the metal rod or the metal pipe, a drawn end of the metal rod or the metal pipe, and a hub hole forming part on the metal pipe, wherein a diameter of a slitting punch is smaller than an outer diameter of a cross section of a splitting object; and the machining method includes the processing operations:

abutting the splitting punch on a position on a periphery of the cross section of the end of any of the metal rod or the metal pipe, the drawn end of the metal rod or the metal pipe, and the hub hole forming part on the metal pipe to form a cleft; and advancing further a slitting in a longitudinal direction of the metal rod or the metal pipe by repeating a press-splitting operation by the slitting punch at the cleft for further or repeatedly one or two or more times;

wherein, when machining the outer circumference of the cross section of any one of an end of the metal pipe end, the drawn end thereof, and the hub hole forming part thereon, a depth of the cleft created in the metal by a press-splitting each time of the press-splitting operation is adjusted in advance by disposing one end of one side of a set of clamping dies, which pinch the inside and the outside of the metal pipe at opposite positions in a state of contacting with whole circumferential surfaces of both the inside and the outside thereof, at the same position as a fore-end of a split-desired portion from an edge of one end face of the metal pipe, and by disposing one side of the other side of the set of clamping dies at the same position as the fore-end of a split-desired portion from the edge of one end face of the metal pipe, or at the same position as the edge of the end face of the metal pipe so as to support the metal pipe, when machining the outer circumference of the cross section of any one of the metal rod end and the drawn end of the metal rod, and the depth of the cleft created in the metal by the press-splitting each time of the press-splitting operation is adjusted in advance by disposing one end of the clamping die, which pinches the outside of the metal rod in a state of contacting with whole circumferential surface of the outside thereof, at the same position as the fore-end of a split-desired portion from the edge of the one end face of the metal rod.

10. The method for joining metal component with another member according to claim 9, wherein a machining method of the outer circumference of the cross section comprises:

a press-splitting is performed to form partially at least any one of a deep groove, a deep recess, and a flange on the periphery of the outer circumference of the cross section of the metal end, using a slitting punch formed to have a diameter smaller than the outer diameter of the cross section of the splitting object, on the periphery of the cross section of one of the metal rod end or the metal pipe end, the drawn end of the metal rod or the metal pipe, and the hub hole forming part on the metal pipe, wherein a cutting edge of the slitting punch has the partially same shape as a cross-sectional outline of any one of the end of the metal rod or the metal pipe, the drawn end of the metal rod or the metal pipe, and the hub hole forming part on the metal pipe; and, when forming at least one of the deep groove, the deep recess and the flange, a notch or a scribe line is provided in advance at positions corresponding to both sides of the periphery of the cross section of the metal pipe on which the slitting punch is abutted to partially form at least one of the deep groove, the deep recess, and the flange on the periphery of the cross section, preventing the cleft created in metal at the time of the press-splitting from spreading to the part other than the part to which the slitting punch is abutted.

11. The method for joining metal component with another member according to claim 9, wherein a machining method of the outer circumference of the cross section comprises:

the cutting edge of the slitting punch has such a shape that the cross section with respect either to an inner side or to an outer side in a radial direction of the metal pipe or the metal rod has a linear part from a tip toward a rear end.

12. The method for joining metal component with another member according to claim 9, wherein the machining method of the outer circumference of the cross section comprises:

dividing by the splitting in the longitudinal direction with respect to the metal plate or the metal rod on the periphery of the cross section of one of the metal rod end or the metal pipe end, the drawn end of the metal rod or the metal pipe, and the hub hole forming part on the metal pipe, and advancing further such dividing by the splitting;

wherein each press-splitting operation by the slitting punch is carried out in a progressive transfer method consisting of operations separated from each other;

when machining the outer circumference of the cross section of one of the metal pipe end, the drawn end, and the hub hole forming part, a position of at least one side of the clamping dies that pinch the inside and the outside of the metal pipe is moved in advance at each process of press-splitting in accordance with a distance from an edge of one end face of the cross section of the metal pipe to a fore-end of the split-desired portion; and, when machining the outer circumference of the cross section of one of the metal rod end and the drawn end of the metal rod, one end of the clamping die that pinches an outer side of the metal rod is moved in accordance with the distance from the edge of one end face of the cross section of the metal rod to the fore-end of the split-desired portion.

\* \* \* \* \*